(12) United States Patent
Harada et al.

(10) Patent No.: US 10,862,118 B2
(45) Date of Patent: Dec. 8, 2020

(54) ACTIVE MATERIAL CONTAINING AN NB2TIO7 PHASE, ELECTRODE, SECONDARY BATTERY, BATTERY PACK, AND VEHICLE

(71) Applicants: KABUSHIKI KAISHA TOSHIBA, Minato-ku (JP); Toshiba Infrastructure Systems & Solutions Corporation, Kawasaki (JP)

(72) Inventors: Yasuhiro Harada, Isehara (JP); Norio Takami, Yokohama (JP); Tetsuya Sasakawa, Yokohama (JP); Yusuke Namiki, Yokohama (JP); Yasunobu Yamashita, Tokyo (JP)

(73) Assignees: KABUSHIKI KAISHA TOSHIBA, Minato-ku (JP); Toshiba Infrastructure Systems & Solutions Corporation, Kawasaki (JP)

( * ) Notice: Subject to any disclaimer, the term of this patent is extended or adjusted under 35 U.S.C. 154(b) by 177 days.

(21) Appl. No.: 16/117,978

(22) Filed: Aug. 30, 2018

(65) Prior Publication Data

US 2019/0296343 A1   Sep. 26, 2019

(30) Foreign Application Priority Data

Mar. 23, 2018   (JP) ................. 2018-056064

(51) Int. Cl.
*H01M 6/42*    (2006.01)
*H01M 4/485*   (2010.01)
(Continued)

(52) U.S. Cl.
CPC ............. *H01M 4/485* (2013.01); *B60L 50/64* (2019.02); *C01G 33/00* (2013.01);
(Continued)

(58) Field of Classification Search
CPC .... H01M 4/485; H01M 4/366; H01M 2/1077; H01M 2/30; H01M 10/0525;
(Continued)

(56) References Cited

U.S. PATENT DOCUMENTS

2012/0115032 A1   5/2012   Harada et al.
2017/0077504 A1*  3/2017   Ise ..................... H01M 4/366
2017/0271667 A1   9/2017   Yoshida et al.

FOREIGN PATENT DOCUMENTS

JP   2010-287496   12/2010
JP   5023239        9/2012
(Continued)

OTHER PUBLICATIONS

Gasperin, M. "Affinement de la structure de TiNb$_2$O$_7$ et repartition des cations", Journal of Solid State Chemistry 53, 1984, 4 pages.

*Primary Examiner* — Raymond Alejandro
(74) *Attorney, Agent, or Firm* — Oblon, McClelland, Maier & Neustadt, L.L.P.

(57) ABSTRACT

An active material includes an Nb$_2$TiO$_7$ phase and at least one Nb-rich phase selected from an Nb$_{10}$Ti$_2$O$_{29}$ phase, an Nb$_{14}$TiO$_{37}$ phase, and an Nb$_{24}$TiO$_{64}$ phase. The active material satisfies a peak intensity ratio represented by the following Formula (1): $0 < I_B/I_A \leq 0.25$ (1). In Formula (1), $I_A$ is a peak intensity of the maximum peak attributed to the Nb$_2$TiO$_7$ phase and appealing at 2θ of 26.0±0.1° in a wide angle X-ray diffraction pattern under CuKα rays as an X-ray source, and $I_B$ is a peak intensity of the maximum peak attributed to the at least one Nb-rich phase and appearing at 2θ of 24.9±0.2° in the diffraction pattern.

11 Claims, 9 Drawing Sheets

(51) Int. Cl.
*C01G 33/00* (2006.01)
*H01M 4/36* (2006.01)
*H01M 10/0525* (2010.01)
*H01M 2/30* (2006.01)
*H01M 2/10* (2006.01)
*B60L 50/64* (2019.01)
*H01M 4/02* (2006.01)

(52) U.S. Cl.
CPC ........... *H01M 2/1077* (2013.01); *H01M 2/30* (2013.01); *H01M 4/366* (2013.01); *H01M 10/0525* (2013.01); *C01P 2002/72* (2013.01); *C01P 2002/77* (2013.01); *C01P 2004/84* (2013.01); *C01P 2006/40* (2013.01); *H01M 2004/027* (2013.01); *H01M 2220/20* (2013.01)

(58) Field of Classification Search
CPC ......... H01M 10/052; H01M 2004/027; H01M 2220/20; C01G 33/00; C01P 2002/72; C01P 2002/77; C01P 2004/84; C01P 2006/40
See application file for complete search history.

(56) References Cited

FOREIGN PATENT DOCUMENTS

| | | |
|---|---|---|
| JP | 2014-103110 | 6/2014 |
| JP | 5925845 | 5/2016 |
| JP | 2017-134972 | 8/2017 |
| JP | 2017-168352 | 9/2017 |

* cited by examiner

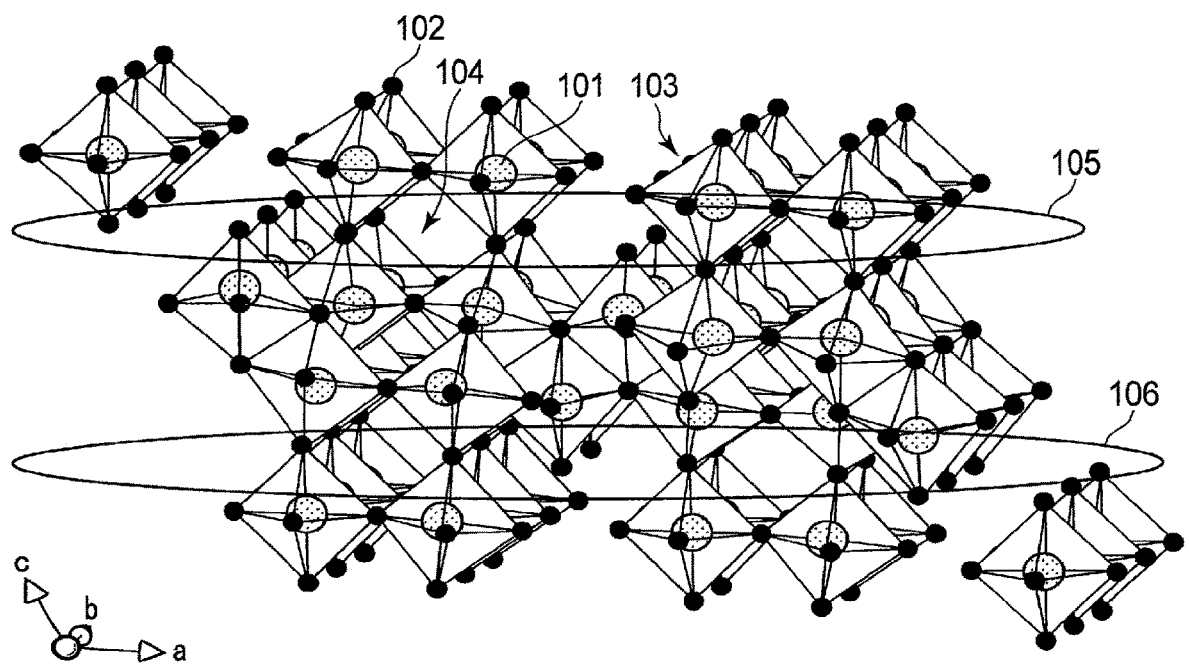
F I G. 1
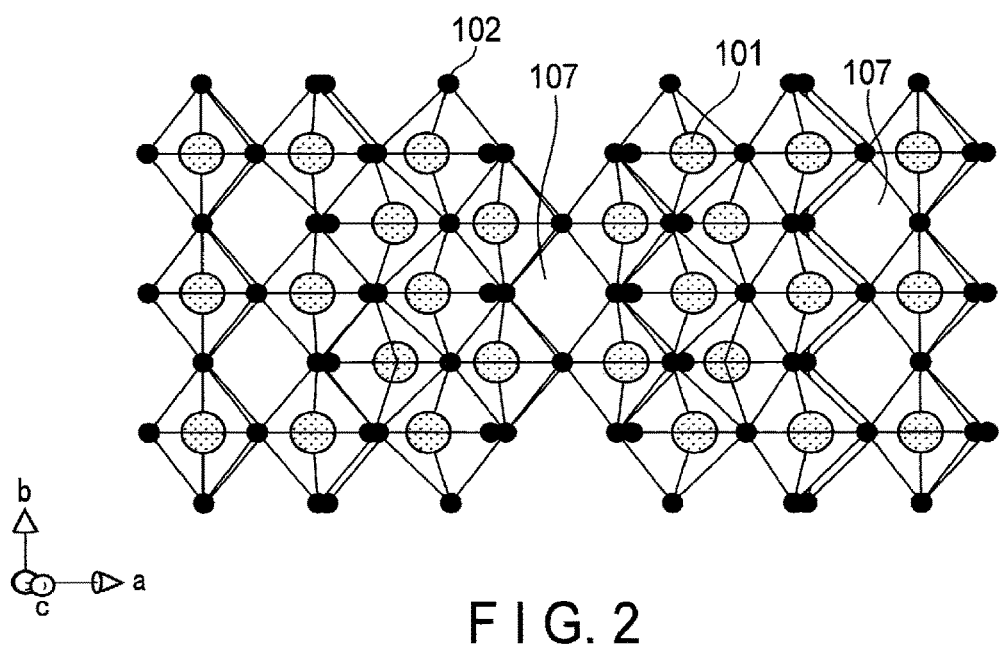
F I G. 2

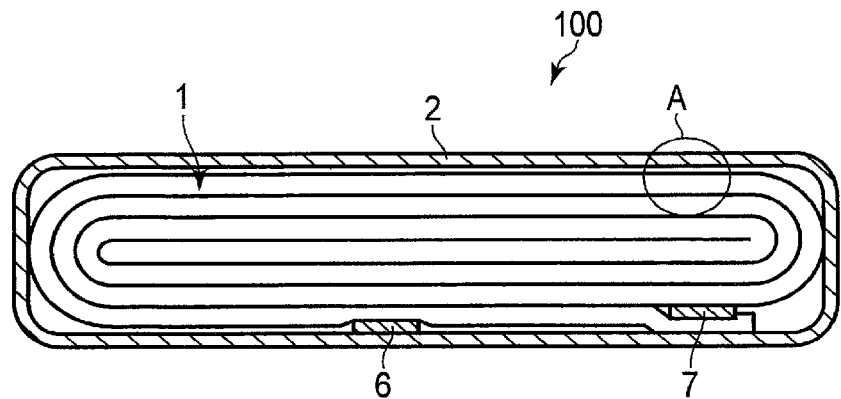
F I G. 4
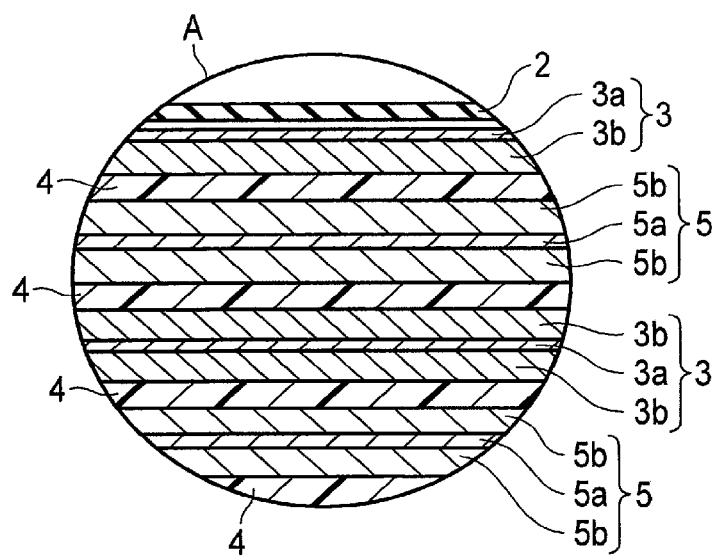
F I G. 5

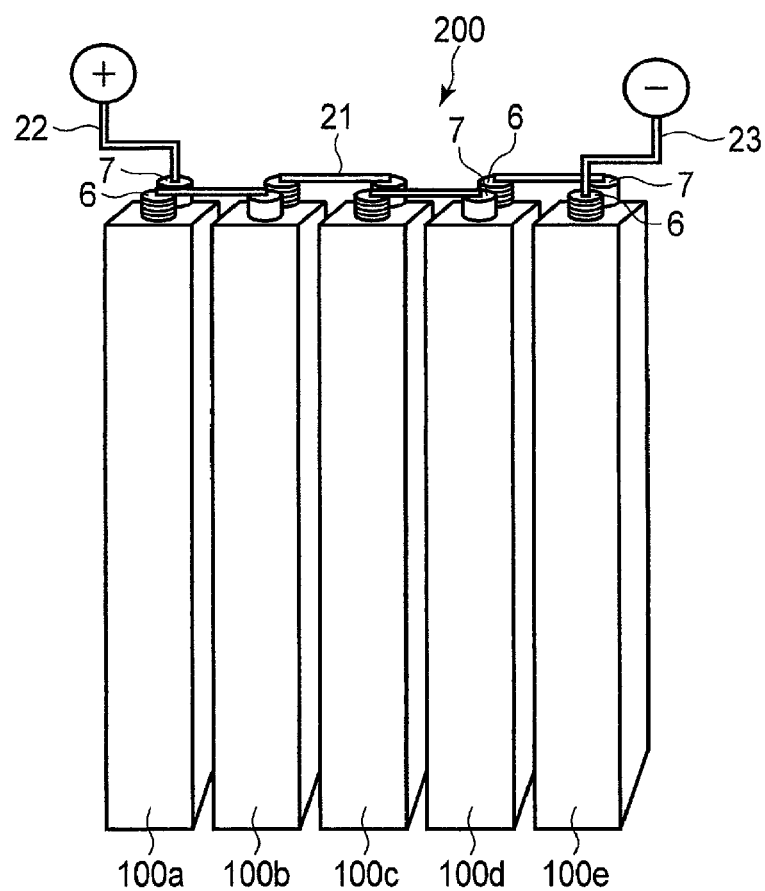
F I G. 8

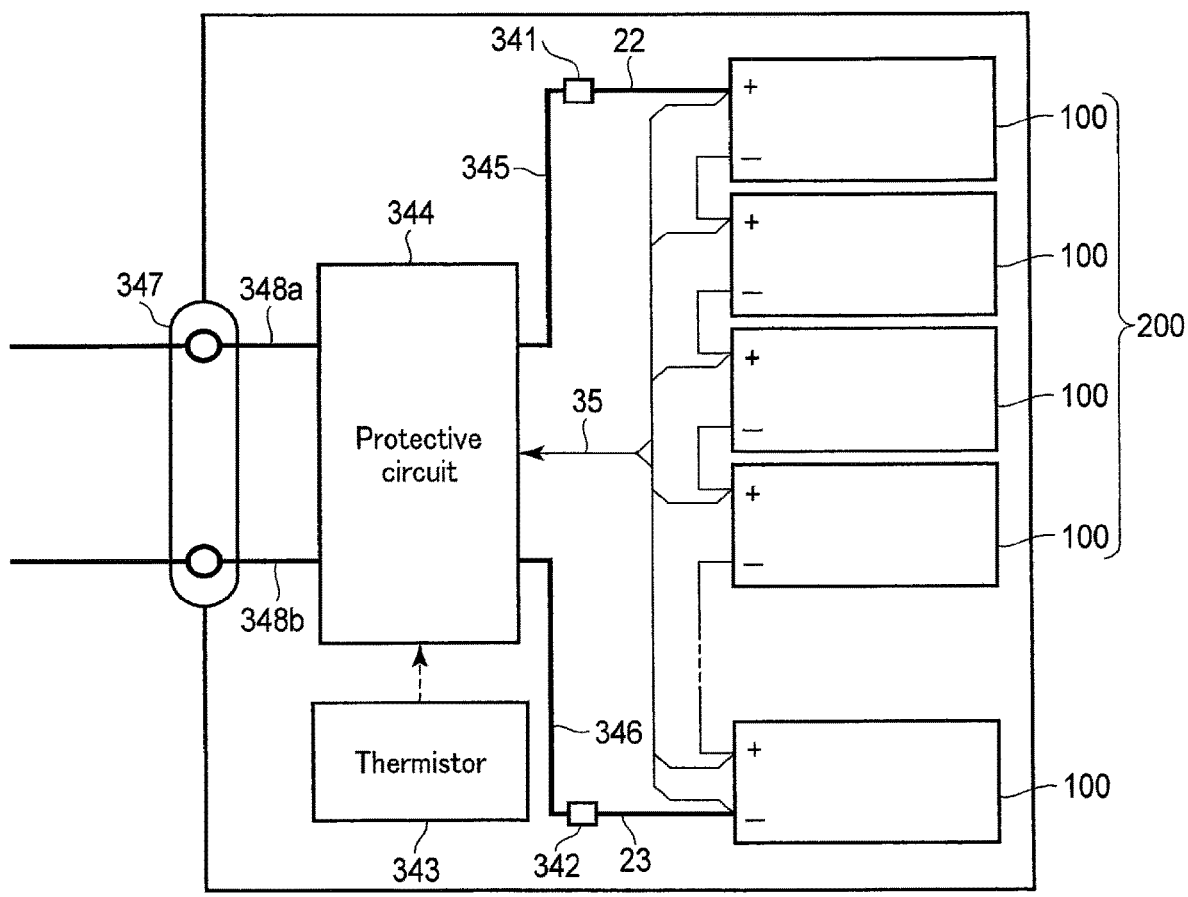
F I G. 10
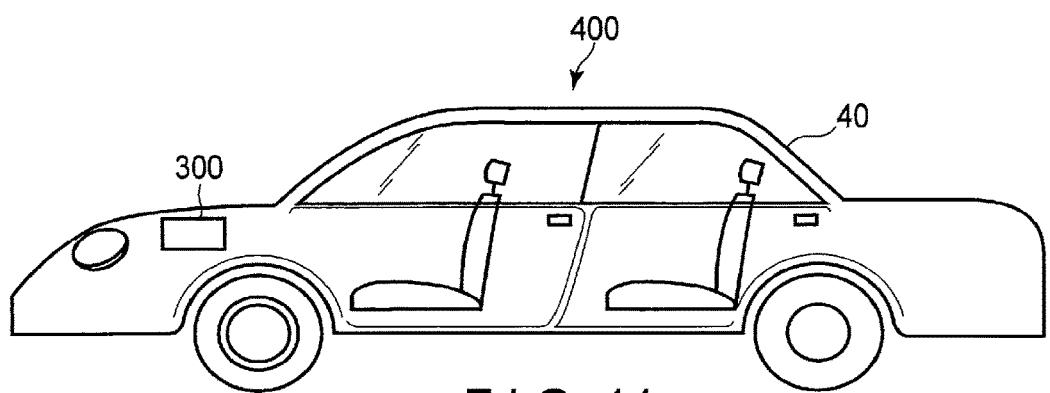
F I G. 11

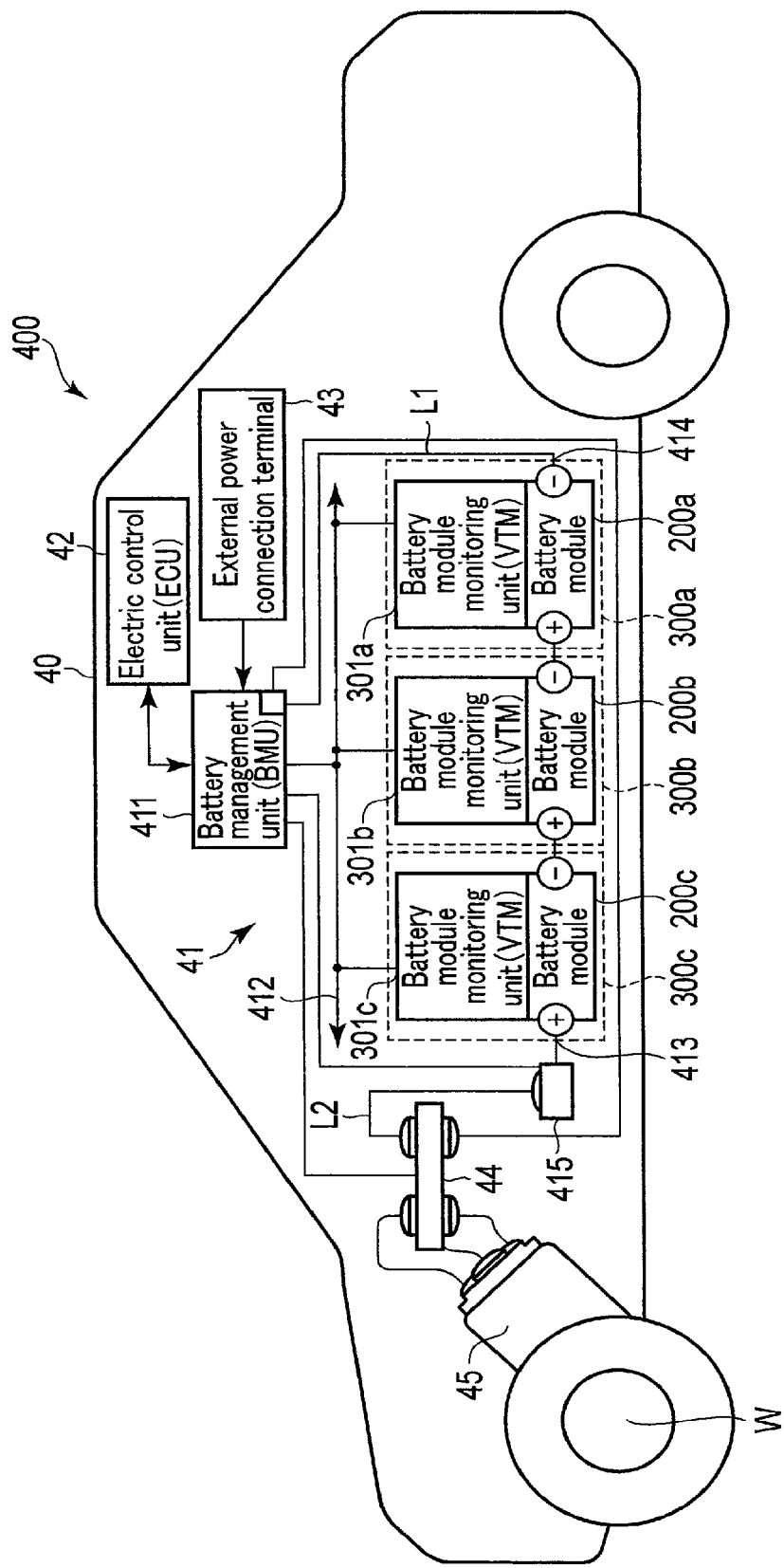
F I G. 12

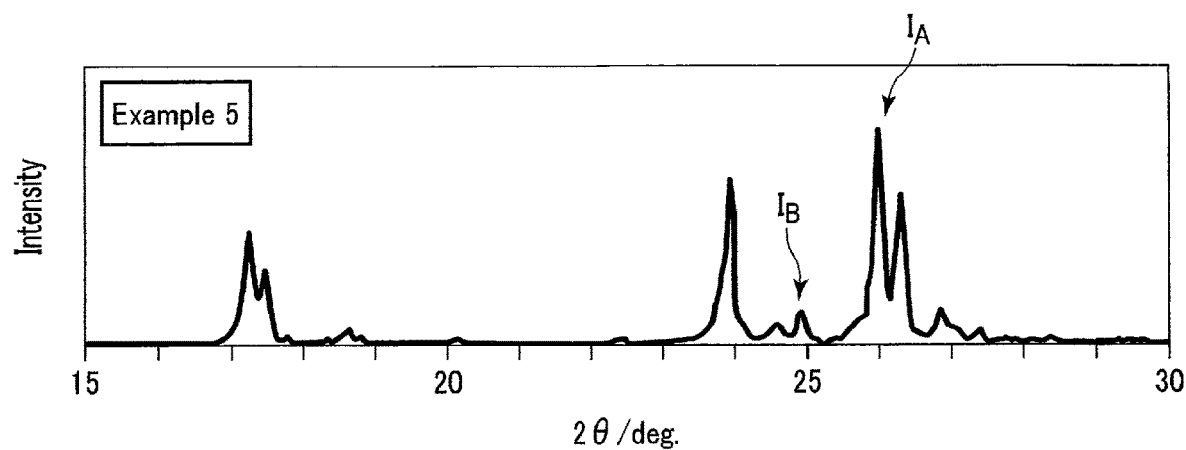
F I G. 13
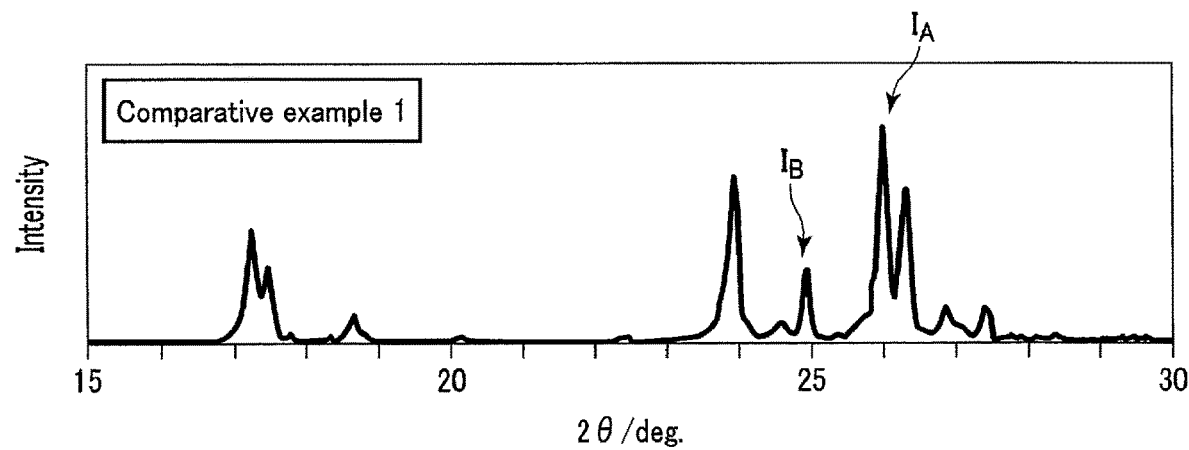
F I G. 14

ACTIVE MATERIAL CONTAINING AN NB2TIO7 PHASE, ELECTRODE, SECONDARY BATTERY, BATTERY PACK, AND VEHICLE

CROSS-REFERENCE TO RELATED APPLICATIONS

This application is based upon and claims the benefit of priority from Japanese Patent Application No. 2018-056064, filed Mar. 23, 2018, the entire contents of which are incorporated herein by reference.

FIELD

Embodiments described herein relate generally to an active material, an electrode, a secondary battery, a battery pack, and a vehicle.

BACKGROUND

Recently, secondary batteries, such as a nonaqueous electrolyte secondary battery like a lithium ion secondary battery, have been actively researched and developed as a high energy-density battery. The secondary batteries, such as a nonaqueous electrolyte secondary battery, are anticipated as a power source for vehicles such as hybrid electric automobiles, electric cars, an uninterruptible power supply for base stations for portable telephones, or the like. Therefore, the secondary battery is demanded to, in addition to having a high energy density, be excellent in other performances such as rapid charge-discharge performances and long-term reliability, as well. For example, not only is the charging time remarkably shortened in a secondary battery capable of rapid charge and discharge, but the battery is also capable of improving motive performances in vehicles such as hybrid electric automobiles, and efficient recovery of regenerative energy of motive force.

In order to enable rapid charge/discharge, electrons and lithium ions must be able to migrate rapidly between the positive electrode and the negative electrode. However, when a battery using a carbon-based negative electrode is repeatedly subjected to rapid charge and discharge, precipitation of dendrite of metallic lithium on the electrode may sometimes occur, raising concern of heat generation or ignition due to internal short circuits.

In light of this, a battery using a metal composite oxide in a negative electrode in place of a carbonaceous material has been developed. In particular, in a battery using an oxide of titanium in the negative electrode, rapid charge and discharge can be stably performed. Such a battery also has a longer life than in the case of using a carbon-based negative electrode.

However, compared to carbonaceous materials, oxides of titanium have a higher potential relative to metallic lithium. That is, oxides of titanium are more noble.

Furthermore, oxides of titanium have a lower capacity per weight. Therefore, a battery using an oxide of titanium for the negative electrode has a problem that the energy density is low.

For example, the electrode potential an oxide of titanium is about 1.5 V (vs. Li/Li$^+$) relative to metallic lithium, which is higher (i.e., more noble) in comparison to potentials of carbon based negative electrodes. The potential of an oxide of titanium is attributed to the redox reaction between Ti$^{3+}$ and Ti$^{4+}$ upon electrochemical insertion and extraction of lithium, and is therefore electrochemically restricted. It is also a fact that rapid charge/discharge of lithium ions can be performed stably at a high electrode potential of about 1.5 V (vs. Li/Li$^+$). Conventionally, it has therefore been difficult to drop the potential of the electrode in order to improve the energy density.

On the other hand, considering the capacity per unit weight, the theoretical capacity of titanium dioxide (anatase structure) is about 165 mAh/g, and the theoretical capacity of spinel type lithium-titanium composite oxides such as Li$_4$Ti$_5$O$_{12}$ is about 180 mAh/g. On the other hand, the theoretical capacity of a general graphite based electrode material is 385 mAh/g and greater. As such, the capacity density of an oxide of titanium is significantly lower than that of the carbon based negative electrode material. This is due to there being only a small number of lithium-insertion sites in the crystal structure, and lithium tending to be stabilized in the structure, and thus, substantial capacity being reduced.

In consideration of the above circumstances, a new electrode material containing Ti and Nb has been studied. Such a niobium-titanium composite oxide material is expected to have a high charge/discharge capacity. Particularly, a composite oxide represented by TiNb$_2$O$_7$ has a high theoretical capacity exceeding 380 mAh/g. Therefore, a niobium-titanium composite oxide is expected as a high-capacity material to replace Li$_4$Ti$_5$O$_{12}$, but there is a problem that capacity balance between a positive electrode and a negative electrode tends to collapse during a charge-and-discharge cycle.

BRIEF DESCRIPTION OF THE DRAWINGS

FIG. 1 is a schematic view illustrating a crystal structure of a niobium-titanium composite oxide Nb$_2$TiO$_7$;

FIG. 2 is a schematic view illustrating the crystal structure of FIG. 1 from another direction;

FIG. 4 is a cross-sectional view schematically illustrating an example of a secondary battery according to an embodiment;

FIG. 5 is an enlarged cross-sectional view of a section A of the secondary battery illustrated in FIG. 4;

FIG. 8 is a perspective view schematically illustrating an example of a battery module according to an embodiment;

FIG. 10 is a block diagram illustrating an example of an electric circuit of the battery pack illustrated in FIG. 9;

FIG. 11 is a cross-sectional view schematically illustrating an example of a vehicle according to an embodiment;

FIG. 12 is a diagram schematically illustrating another example of the vehicle according to the embodiment;

FIG. 13 is a graph illustrating diffraction peaks obtained by powder X-ray diffraction measurement according to Example 5; and FIG. 14 is a graph illustrating diffraction peaks obtained by powder X-ray diffraction measurement according to Comparative Example 1.

DETAILED DESCRIPTION

Figure 3:
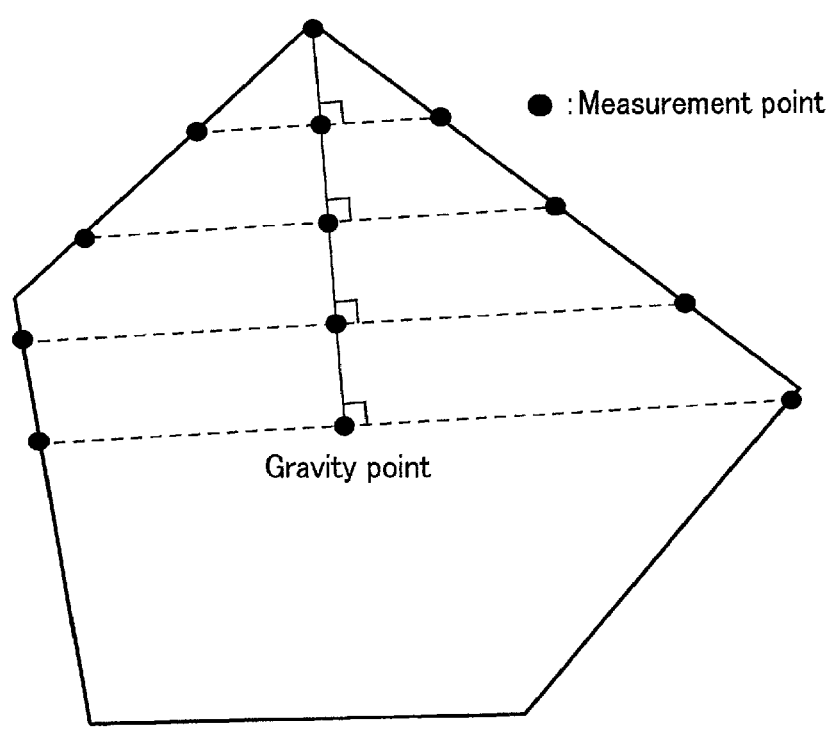
FIG. 3 is a plan view schematically illustrating particles to be measured in a transmission electron microscope (TEM) observation.

According to a first embodiment, an active material is provided. The active material includes an Nb$_2$TiO$_7$ phase and at least one Nb-rich phase selected from the group consisting of an $Nb_{10}Ti_2O_{29}$ phase, an $Nb_{14}TiO_{37}$ phase, and an $Nb_{24}TiO_{64}$ phase. The active material satisfies a peak intensity ratio represented by the following Formula (1).

$$0 < I_B/I_A \leq 0.25 \quad (1)$$

In Formula (1), $I_A$ is a peak intensity of the maximum peak attributed to the $Nb_2TiO_7$ phase and appearing at 2θ of 26.0±0.1° in a wide angle X-ray diffraction pattern under CuKα rays as an X-ray source. $I_B$ is a peak intensity of the maximum peak attributed to the at least one Nb-rich phase and appearing at 2θ of 24.9±0.2° in the diffraction pattern.

According to a second embodiment, an electrode is provided. The electrode includes the active material according to the first embodiment.

According to a third embodiment, there is provided a secondary battery including a negative electrode, a positive electrode, and an electrolyte. The negative electrode is the electrode according to the second embodiment.

According to a fourth embodiment, a battery pack is provided. The battery pack includes the secondary battery according to the third embodiment.

According to a fifth embodiment, a vehicle is provided. The vehicle includes the battery pack according to the fourth embodiment.

Hereinafter, embodiments will be described with reference to the drawings. The same reference signs are applied to common components throughout the embodiments and overlapped explanations are thereby omitted. Each drawing is a schematic view for encouraging explanations of the embodiment and understanding thereof, and thus there are some details in which a shape, a size and a ratio are different from those in a device actually used, but they can be appropriately design-changed considering the following explanations and known technology.

First Embodiment

According to a first embodiment, an active material is provided. The active material includes an $Nb_2TiO_7$ phase and at least one Nb-rich phase selected from the group consisting of an $Nb_{10}Ti_2O_{29}$ phase, an $Nb_{14}TiO_{37}$ phase, and an $Nb_{24}TiO_{64}$ phase. The active material satisfies a peak intensity ratio represented by the following Formula (1).

$$0 < I_B/I_A \leq 0.25 \quad (1)$$

In Formula (1), $I_A$ is a peak intensity of the maximum peak attributed to the $Nb_2TiO_7$ phase and appearing at 2θ of 26.0±0.1° in a wide angle X-ray diffraction pattern under CuKα rays as an X-ray source. $I_B$ is a peak intensity of the maximum peak attributed to the at least one Nb-rich phase and appearing at 2θ of 24.9±0.2° in the diffraction pattern.

A description will be given regarding a reason why such an active material can realize a secondary battery capable of exhibiting excellent weight energy density, over-charge resistance, and cycle life characteristics.

First, the $Nb_2TiO_7$ phase will be described.

The main phase contained in the active material according to the embodiment is a niobium-titanium composite oxide phase represented by $Nb_2TiO_7$ as a representative composition. A composition of the niobium-titanium composite oxide preferably has a crystal structure having a symmetry of the space group C2/m and an atomic coordination described in Journal of Solid-State Chemistry 53, pp. 144-147 (1984) although not limited thereto.

The niobium-titanium composite oxide mainly has a monoclinic crystal structure. As an example, schematic views of the crystal structure of monoclinic $Nb_2TiO_7$ are illustrated in FIGS. 1 and 2.

As illustrated in FIG. 1, in the crystal structure of monoclinic $Nb_2TiO_7$, a metal ion 101 and an oxide ion 102 form a skeleton structure section 103. At a position of the metal ion 101, Nb ions and Ti ions are arbitrarily arranged at a ratio of Nb:Ti=2:1. Such skeleton structures 103 are alternately arranged three-dimensionally, thereby vacancies 104 are formed among the skeleton structures 103. These vacancies 104 serve as hosts for lithium ions. Lithium ions can be inserted in this crystal structure from 0 moles up to a maximum of 5.0 moles. Therefore, the composition when 0 to 5.0 moles of lithium ions are inserted can be expressed as $Li_xNb_2TiO_7$ (0≤x≤5).

In FIG. 1, regions 105 and 106 are sections having two-dimensional channels in [100] and [010] directions. As illustrated in FIG. 2, the crystal structure of monoclinic $Nb_2TiO_7$ has a vacancy 107 along a [001] direction. This vacancy 107 has a tunnel structure advantageous in conduction of lithium ions and serves as an electrically conductive path in a [001] direction connecting region 105 and region 106. This electrically conductive path makes it possible for the lithium ions to migrate between regions 105 and 106. Further, the niobium-titanium composite oxide has a lithium insertion potential of about 1.5 V (vs. $Li/Li^+$). Therefore, an electrode including the niobium-titanium composite oxide as the active material can realize a battery that can stably repeat rapid charging and discharging.

When a lithium ion is inserted into the vacancy 104 in the above crystal structure, the metal ion 101, which forms the skeleton, is reduced to a trivalent, thereby maintaining electric neutrality of a crystal. In the niobium-titanium composite oxide, not only a Ti ion is reduced from tetravalent to trivalent, but also an Nb ion is reduced from pentavalent to trivalent. Therefore, the number of reduced valences per active material weight is large. Therefore, the niobium-titanium composite oxide can maintain electric neutrality of the crystal even if many lithium ions are inserted. Thus, energy density is higher in the niobium-titanium composite oxide as compared to that of a compound such as titanium oxide only containing a tetravalent cation. In addition, the $Nb_2TiO_7$ phase is superior to the $Nb_{10}Ti_2O_{29}$ phase, the $Nb_{14}TiO_{37}$ phase, and the $Nb_{24}TiO_{64}$ phase, which will be described later, in terms of the weight energy density. This is because the number of Nb atoms per mol contained in the $Nb_{10}Ti_2O_{29}$ phase, the $Nb_{14}TiO_{37}$ phase, and the $Nb_{24}TiO_{64}$ phase is large, that is, the weight per mol thereof is large.

Next, the $Nb_{10}Ti_2O_{29}$ phase, the $Nb_{14}TiO_{37}$ phase, and the $Nb_{24}TiO_{64}$ phase will be described. A basic skeleton structure thereof is similar to the crystal structure of the monoclinic $Nb_2TiO_7$ illustrated in FIGS. 1 and 2. When a lithium ion is inserted into the vacancy 104, the metal ion 101, which forms the skeleton, is reduced to a trivalent, thereby maintaining electric neutrality of a crystal. The composition when lithium ions are inserted into the $Nb_{10}Ti_2O_{29}$ phase can be expressed as $Li_xNb_{10}Ti_2O_{29}$ (0≤x≤22). The composition when lithium ions are inserted into the $Nb_{14}TiO_{37}$ phase can be expressed as $Li_xNb_{14}TiO_3$ (0≤x≤29). The composition when lithium ions are inserted into the $Nb_{24}TiO_{64}$ phase can be expressed as $Li_xNb_{24}TiO_{64}$ (0≤x≤49).

In the $Nb_{10}Ti_2O_{29}$ phase, $Nb_{14}TiO_{37}$ phase, and $Nb_{24}TiO_{64}$ phase containing a lot of niobium, the amount of reduction of Nb ions from tetravalent to trivalent is larger than that of $Nb_2TiO_7$ phase. Therefore, the number of reduced valences per mol of the active material is large. Therefore, $Nb_{10}Ti_2O_{29}$ phase, $Nb_{14}TiO_{37}$ phase, and the $Nb_{24}TiO_{64}$ phase can maintain electric neutrality of the crystal even if many lithium ions are inserted. Therefore, at least one Nb-rich phase selected from the group consisting of the $Nb_{10}Ti_2O_{29}$ phase, the $Nb_{14}TiO_{37}$ phase, and the $Nb_{24}TiO_{64}$ phase can stably maintain the crystal structure even when lithium ions are excessively inserted as compared with the $Nb_2TiO_7$ phase. As a result, even when lithium ions are excessively inserted, active material particles can be stably charged and discharged in the Nb-rich phase. That is, the Nb-rich phase is excellent in over-charge resistance. Incidentally, the Nb-rich phase in the present specification means a niobium-titanium composite oxide phase having an Nb/Ti ratio larger than two.

On the other hand, the number of reduced valences per active material weight of the Nb-rich phase is smaller than that of the $Nb_2TiO_7$ phase. That is, since the weight per mol is large in the Nb-rich phase, the weight energy density is inferior to that of the $Nb_2TiO_7$ phase.

If the active material contains not only the $Nb_2TiO_7$ phase but also at least one Nb-rich phase selected from the group consisting of the $Nb_{10}Ti_2O_{29}$ phase, the $Nb_{14}TiO_{37}$ phase, and the $Nb_{24}TiO_{64}$ phase, the potential of the Nb-rich phase preferentially drops when the secondary battery is turned into the over-charged state. Therefore, it is possible to suppress a potential rise of the positive electrode while ensuring a constant charging voltage during charging. As a result, the active material according to the embodiment can suppress generation of an oxidizing gas in the positive electrode and deterioration of the positive electrode, and thus, has excellent cycle life characteristics.

Furthermore, the active material according to the embodiment satisfies the peak intensity ratio represented by the following Formula (1).

$$0 < I_B/I_A \le 0.25 \quad (1)$$

In Formula (1), $I_A$ is a peak intensity of the maximum peak attributed to the $Nb_2TiO_7$ phase and appearing at 2θ of 26.0±0.10 in a wide angle X-ray diffraction pattern under CuKα rays as an X-ray source, and $I_B$ is a peak intensity of the maximum peak attributed to at least one Nb-rich phase selected from the group consisting of the $Nb_{10}Ti_2O_{29}$ phase, the $Nb_{14}TiO_{37}$ phase, and the $Nb_{24}TiO_{64}$ phase and appearing at 2θ of 24.9±0.20 in the above diffraction pattern. A method of performing the wide angle X-ray diffraction method and obtaining a diffraction pattern will be described later.

The peak intensity $I_A$ is the peak intensity (peak height) attributed to the $Nb_2TiO_7$ phase. This peak is a peak having the maximum peak intensity within a range where 2θ is 26.0±0.1°. A high peak intensity $I_A$ means that the weight of the $Nb_2TiO_7$ phase accounting for the active material is large.

The peak intensity $I_B$ is a peak intensity (peak height) attributed to at least one Nb-rich phase selected from the group consisting of the $Nb_{10}Ti_2O_{29}$ phase, the $Nb_{14}TiO_{37}$ phase, and the $Nb_{24}TiO_{64}$ phase. This peak is a peak having the maximum peak intensity within a range where 2θ is 24.9±0.20. A high peak intensity $I_B$ means that the weight of the Nb-rich phase accounting for the active material is large.

As described above, the over-charge resistance improves as the active material contains the Nb-rich phase. However, when the Nb-rich phase is infinitely increased, the over-charge resistance does not improve by the amount of such an increase. In addition, if the peak intensity ratio $I_B/I_A$ is excessively large, not only the weight energy density is lowered because the active material becomes heavy but also the electrode is distorted or active material particles crack due to a difference in a volume expansion rate at the time of charging and discharging between the $Nb_2TiO_7$ phase and at least one Nb-rich phase selected from the group consisting of the $Nb_{10}Ti_2O_{29}$ phase, the $Nb_{14}TiO_{37}$ phase, and the $Nb_{24}TiO_{64}$ phase, which is not preferable. Therefore, the peak intensity ratio ($I_B/I_A$) is 0.25 or less.

The peak intensity ratio $I_B/I_A$ is larger than 0. The over-charge resistance and the cycle life tend to decrease if the peak intensity ratio $I_B/I_A$ is excessively small because the weight of the Nb-rich phase is insufficient.

The peak intensity ratio $I_B/I_A$ is preferably 0.01 to 0.25, more preferably 0.01 to 0.15, and still more preferably 0.05 to 0.1.

As described above, the active material according to the embodiment contains the $Nb_2TiO_7$ phase and at least one Nb-rich phase selected from the group consisting of $Nb_{10}Ti_2O_{29}$ phase, $Nb_{14}TiO_{37}$ phase, and the $Nb_{24}TiO_{64}$ phase, and the peak intensity ratio $IS/I_A$ thereof satisfies $0 < I_B/I_A \le 0.25$, and thus, it is possible to realize the secondary battery capable of exhibiting excellent weight energy density, over-charge resistance, and cycle life characteristics.

The active material according to the embodiment may contain primary particles formed of single phase of the $Nb_2TiO_7$ phase and primary particles formed of single phase of at least one Nb-rich phase selected from the group consisting of the $Nb_{10}Ti_2O_{29}$ phase, the $Nb_{14}TiO_{37}$ phase, and the $Nb_{24}TiO_{64}$ phase.

It is more preferable that the active material contains a mixed-phase active material particle including a shell part formed of the $Nb_2TiO_7$ phase and a core part surrounded by the shell part and formed of the Nb-rich phase. Since the $Nb_2TiO_7$ phase having a small weight is positioned as the shell part on the surface of the active material particle so as to include the core part formed of the Nb-rich phase having a high over-charge resistance, it is possible to uniformly and rapidly take excessively-inserted lithium ions into the electrode.

The mixed-phase active material particles are preferably contained in an amount within the range of 0.1% by mass to 100% by mass relative to the total amount of the active material.

The active material according to the embodiment may contain at least one additive element selected from the group consisting of Si, Fe, Ta, K, Na, P, and Sn. The amount of the additive element contained in the active material is preferably 0.5 atm % or less relative to the Nb element in the active material. When the active material contains at least one selected from the group consisting of Fe, Ta, and Sn, the electron conductivity of the active material can be enhanced. When the active material contains at least one selected from the group consisting of Si, Na, K, and P, it is possible to mitigate the reduction in capacity caused by the Nb-rich phase having the large weight.

The above-described additive element may be contained in the $Nb_2TiO_7$ phase or may be contained in at least one Nb-rich phase selected from the group consisting of $Nb_{10}Ti_2O_{29}$ phase, $Nb_{14}TiO_{37}$ phase, and the $Nb_{24}TiO_{64}$ phase. Alternatively, both the $Nb_2TiO_7$ phase, and the Nb-rich phase may contain the additive element. However, in either case, a content of the additive element is preferably 0.5 atm % or less relative to the Nb element in the active material.

The mixed-phase active material particle may further contain an intermediate part interposed between the core part and the shell part. There is no clear boundary between the core part and the intermediate part and between the intermediate part and the shell part. The intermediate part may cover the entire surface of the core part or may cover a part of the core part.

The intermediate part contains the $Nb_2TiO_7$ phase and at least one Nb-rich phase selected from the group consisting of the $Nb_{10}Ti_2O_{29}$ phase, the $Nb_{14}TiO_{37}$ phase, and the $Nb_{24}TiO_{64}$ phase. In the intermediate part, the concentration of the $Nb_2TiO_7$ phase in a region adjacent to the shell part is preferably higher than the concentration of the $Nb_2TiO_7$ phase in a region adjacent to the core part.

Further, the intermediate part preferably has a concentration gradient of the $Nb_2TiO_7$ phase rising from the core part side to the shell part side. The concentration gradient of the intermediate part is continuous. When the intermediate part has such a concentration gradient, the flow of lithium ions at the time of over-charge can be smoothed, and further, the cracking of particles caused by a change in volume during charging and discharging can be suppressed.

The $Nb_2TiO_7$ phase and at least one Nb-rich phase selected from the group consisting of the $Nb_{10}Ti_2O_{29}$ phase, the $Nb_{14}TiO_{37}$ phase, and the $Nb_{24}TiO_{64}$ phase may interpenetrate each other in at least a part of the intermediate part. Interpenetration indicates a part where texture patterns corresponding to the respective phases are mixed alternately and there is no clear boundary region when observing the texture patterns in the crystal with a transmission electron microscope (TEM). Since the $Nb_2TiO_7$ phase, and the Nb-rich phase interpenetrate with each other, an effect of rapidly moving lithium ions into the crystal is achieved.

The crystal structure of the shell part, the intermediate part, and the core part included in the active material can be observed by, for example, powder X-ray diffraction measurement and transmission electron microscope (TEM) observation, and the like. Details of these measurement methods will be described later.

Next, a form, a particle diameter, and a specific surface area of the active material according to the embodiment will be described.

<Form>

The form of the active material (niobium-titanium composite oxide) according to the embodiment is not particularly limited. The niobium-titanium composite oxide can take the form of, for example, primary particles, and also can take the form of secondary particles obtained by aggregation of primary particles. The particles of the niobium-titanium composite oxide may be a mixture of primary particles and secondary particles.

The particles of the niobium-titanium composite oxide may have a carbon-containing layer on its surface. The carbon-containing layer may be attached to the surface of the primary particle or may be attached to the surface of the secondary particle. Alternatively, the particles of the niobium-titanium composite oxide may contain secondary particles formed by aggregation of primary particles having a carbon-containing layer attached on its surface. Such secondary particles can exhibit excellent conductivity since carbon exists among the primary particles. The above-described mode containing the secondary particles is preferable since the active material-containing layer can exhibit a lower resistance.

<Particle Size>

An average particle size of the active material particles, which are the primary particles or the secondary particles of the niobium-titanium composite oxide, is not particularly limited. An average particle size of the active material particle is, for example, in the range of 0.1 μm to 50 μm. The average particle size can be varied in accordance with required battery characteristics. For example, it is preferable to set the average particle size to 1.0 μm or less in order to enhance rapid charge/discharge performance. In this manner, it is possible to reduce a diffusion distance between lithium ions in the crystal, so that the rapid charge/discharge performance can be enhanced. The average particle size can be obtained by laser diffraction, for example.

<BET Specific Surface Area>

The BET (Brunauer, Emmett, Teller) specific surface area of the active material according to the embodiment is not particularly limited. However, the BET specific surface area is preferably 5 $m^2/g$ or more and less than 200 $m^2/g$.

If the specific surface area is 5 $m^2/g$ or more, a contact area with the electrolyte can be secured, favorable discharge rate characteristics can be easily obtained, and the charging time can be shortened. If the specific surface area is less than 200 $m^2/g$, on the other hand, reactivity with the electrolyte does not become too high so that the life performance can be improved. Further, coating properties of a slurry used in the production of an electrode described below and including the active material can be made favorable.

Here, for the measurement of the specific surface area, a method is used by which molecules, in which an occupied area in adsorption is known, are adsorbed onto the surface of powder particles at a temperature of liquid nitrogen and the specific surface area of the sample is determined from the amount of adsorbed molecules. The most commonly used is the BET method based on low-temperature and low-humidity physical adsorption of an inert gas, which is the most famous theory as a method of calculating the specific surface area by extending the Langmuir theory, which is monomolecular layer adsorption theory to multi-molecular layer adsorption. The specific surface area determined by the above method is referred to as a "BET specific surface area".

<Manufacturing Method>

The active material according to the embodiment can be manufactured by a first synthesis method or a second synthesis method to be described hereinafter. Both the first synthesis method and the second synthesis method are solid phase synthesis methods.

(First Synthesis Method)

The first synthesis method is a method of manufacturing primary particles of the single phase of the $Nb_2TiO_7$ phase, primary particles of the single phase of the $Nb_{10}Ti_2O_{29}$ phase, primary particles of the single phase of the $Nb_{14}TiO_{37}$ phase, and/or primary phase of the single phase of $Nb_{24}TiO_{64}$ phase, and mixing these particles in such an amount as to satisfy the following Formula (1).

$$0 < I_B/I_A \leq 0.25 \quad (1)$$

In Formula (1), $I_A$ is a peak intensity of the maximum peak attributed to the $Nb_2TiO_7$ phase and appearing at 2θ of 26.0±0.1° in a wide angle X-ray diffraction pattern under CuKα rays as an X-ray source, and $I_B$ is a peak intensity of the maximum peak attributed to the Nb-rich phase and appearing at 2θ of 24.9±0.2° in the diffraction pattern.

In other words, the niobium-titanium composite oxide manufactured by the first synthesis method does not contain mixed-phase active material particles, but contain primary particles of the single phase of the $Nb_2TiO_7$ phase, the primary particles of the single phase of the $Nb_{10}Ti_2O_{29}$ phase, the primary particles of the single phase of the $Nb_{14}TiO_{37}$ phase, and/or the primary phase of the single phase of the $Nb_{24}TiO_{64}$ phase.

The primary particles of each single phase of the crystal phase can be synthesized as follows. First, $Nb_2O_5$ particles and $TiO_2$ particles as starting materials are mixed at an Nb/Ti ratio which a target phase contains. This mixture is mixed in a ball mill for 1 hour to 10 hours, and then, fired at a temperature of 900° C. to 1200° C. for 1 hour to 3 hours, whereby it is possible to obtain active material particles formed of target single phase crystal phase. Thereafter, the primary particles of the single phase of the $Nb_2TiO_7$ phase are mixed with the primary particles of the single phase of the Nb-rich phase selected from the group consisting of the $Nb_{10}Ti_2O_{29}$ phase, the $Nb_{14}TiO_{37}$ phase, and the $Nb_{24}TiO_{64}$ phase.

(Second Synthesis Method)

According to the second synthesis method, it is possible to prepare mixed-phase active material particles containing the $Nb_2TiO_7$ phase and at least one Nb-rich phase selected from the group consisting of the $Nb_{10}Ti_2O_{29}$ phase, the $Nb_{14}TiO_{37}$ phase, and the $Nb_{24}TiO_{64}$ phase.

$Nb_2O_5$ particles and $TiO_2$ particles as starting materials are mixed. At this time, the starting materials are mixed such that a molar ratio becomes richer in Nb than $Nb_2O_5:TiO_2=1:1$. Alternatively, an average particle size of the $Nb_2O_5$ particles as the raw material is set to be larger than an average particle size of the $TiO_2$ particles. It is more preferable to mix the starting materials such that the molar ratio of the starting materials becomes richer in Nb than $Nb_2O_5:TiO_2=1:1$ and to set the average particle size of the $Nb_2O_5$ particles as the raw material to be larger than the average particle size of the $TiO_2$ particles.

Specifically, the molar ratio $Nb_2O_5:TiO_2$ of the starting materials is preferably in the range of 1.01:1 to 1.5:1. This is because the phase that becomes rich in Nb is stably formed when the molar ratio of the starting material is within this range.

It is preferable that the average particle size of the $Nb_2O_5$ particles be 5 μm or more, and the average particle size of the $TiO_2$ particles be 1 μm or less. If there is a difference in the particle size between the $Nb_2O_5$ particle and the $TiO_2$ particle, atom diffusion during solid-phase firing is not sufficiently performed. By utilizing this fact, it is possible to manufacture the shell part formed of the $Nb_2TiO_7$ phase and the core part formed of the Nb-rich phase selected from the group consisting of the $Nb_{10}Ti_2O_{29}$ phase, the $Nb_{14}TiO_{37}$ phase, and the $Nb_{24}TiO_{64}$ phase and to cause the core part to be included inside the shell part. That is, since Ti is sufficiently diffused on the outside (superficial part) of the $Nb_2O_5$ particle as the raw material, the $Nb_2TiO_7$ phase having a small Nb/Ti ratio is formed. On the other hand, the diffusion of Ti is insufficient at the central part of the $Nb_2O_5$ particles, and the $Nb_{10}Ti_2O_{29}$ phase, the $Nb_{14}TiO_{37}$ phase and/or the $Nb_{24}TiO_4$ phase with a large Nb/Ti ratio is generated.

Each average particle size of the $Nb_2O_5$ particles and the $TiO_2$ particles is a particle size of a volume frequency of 50%. The average particle size can be measured by a laser diffraction and scattering type particle size distribution measuring apparatus.

At the time of synthesis using the solid-phase method, first, the mixture of raw materials is mixed in a ball mill for 1 hour to 10 hours. Thereafter, pre-firing (first firing) is performed before main firing. The pre-firing is desirably performed at a temperature of 600° C. to 1100° C. for 1 hour to 12 hours. By performing the pre-firing, it is possible to remove a trace amount of impurity components (for example, water, organic matters, and the like) adsorbed to a raw material powder. The pre-firing may be omitted.

The main firing (second firing) is preferably performed at a temperature of 900° C. to 1200° C. for 1 hour to 10 hours. It is more preferable to perform the main firing at a temperature of 950° C. to 1050° C. for 2.5 hours to 3.5 hours. It is possible to manufacture a mixed-phase active material particle satisfying a peak intensity ratio represented by the following Formula (1) by suppressing the reaction between Nb and Ti by setting the firing temperature in the range of 900 to 1200° C.

$$0 < I_B/I_A \leq 0.25 \qquad (1)$$

In Formula (1), $I_A$ is a peak intensity of the maximum peak attributed to the $Nb_2TiO_7$ phase and appearing at 2θ of 26.0±0.10 in a wide angle X-ray diffraction pattern under CuKα rays as an X-ray source. $I_B$ is a peak intensity of the maximum peak attributed to the $Nb_{10}Ti_2O_{29}$ phase, the $Nb_{14}Ti_{37}$ phase, and the $Nb_{24}TiO_{64}$ phase and appearing at 2θ of 24.9±0.2° in the diffraction pattern.

The mixed-phase active material particle that can be synthesized by the second synthesis method includes the shell part and the core part, and the intermediate part interposed therebetween. The intermediate part contains the $Nb_2TiO_7$ phase, and the Nb-rich phase, and has the concentration gradient of the $Nb_2TiO_7$ phase rising from the core part side to the shell part side. In addition, the $Nb_2TiO_7$ phase and at least one Nb-rich phase selected from the group consisting of the $Nb_{10}Ti_2O_{29}$ phase, the $Nb_{14}TiO_{37}$ phase, and the $Nb_{24}TiO_{64}$ phase interpenetrate each other in at least a part of the intermediate part. During the synthesis, oxides containing Si, Na, K, and P or the like may be added as raw materials. These elements can lower a melting point of the Nb-rich phase. As a result, there is an effect of making the $Nb_2TiO_7$ phase and the Nb-rich phase more easily interpenetrate each other.

When the main firing is performed at a temperature lower than 900° C., the reaction between Nb and Ti hardly proceed and a raw material oxide remains. In addition, if the main firing is performed at a temperature exceeding 1200° C., the material tends to be homogeneous in composition since the diffusion of the Nb element and the Ti element proceeds rapidly so that it becomes difficult to form the mixed phase of the $Nb_2TiO_7$ phase, and the at least one Nb-rich phase selected from the group consisting of the $Nb_{10}Ti_2O_{29}$ phase, the $Nb_{14}TiO_{37}$ phase, and the $Nb_{24}TiO_{64}$ phase in a primary particle.

Annealing may be performed after the main firing. A temperature of the annealing is desirably 350° C. to 800° C. By performing the annealing in this temperature range, the distortion in the crystal can be alleviated, and an interpenetration part of a crystal lattice between different crystal phases can be stabilized.

<Powder X-Ray Diffraction Measurement of Active Material and Calculation of Peak Intensity Ratio $I_B/I_A$>

The powder X-ray diffraction measurement of the active material can be performed, for example, as follows.

First, the target sample is ground until an average particle size reaches about 5 μm. A holder part, which has a depth of 0.2 mm and is formed on a glass sample plate, is filled with the ground sample. At this time, care should be taken to fill the holder part sufficiently with the sample.

In addition, Precaution should be taken to perform the filling with the amount of the sample neither being excessive nor insufficient such that cracks, voids, and the like do not occur. Next, another glass plate is pushed from the outside to flatten a surface of the sample filling the holder part. Precaution should be taken not to cause a recess or a protrusion from a reference plane of the holder due to an excessive or insufficient amount of filling.

Next, the glass plate filled with the sample is set in a powder X-ray diffractometer, and a diffraction pattern (X-Ray diffraction pattern (XRD pattern)) is obtained using Cu-Kα rays.

Incidentally, there is a case where the orientation of the sample increases depending on a particle shape of the sample. In the case where there is high degree of orientation in the sample, there is the possibility of deviation of the peak or variation in an intensity ratio, depending on the filling state of the sample. The sample whose orientation is remarkably high in this manner is measured using a glass capillary. Specifically, a sample is inserted into a capillary, and this capillary is placed on a rotary sample stage and measured. It is possible to alleviate the orientation with the above-described measuring method. It is preferable to use a capillary formed of Lindeman glass having a diameter of 1 mm to 6 mmφ as the glass capillary.

When the powder X-ray diffraction measurement is performed on the active material contained in the electrode, the measurement is performed, for example, as follows.

First, a state in which lithium ions are completely extracted from the active material is achieved in order to comprehend the crystal structure of the active material. For example, when the active material is used in the negative electrode, the battery is turned into a completely-discharged state. For example, the discharged state of the battery can be achieved by repeating several times a discharging of the battery in a 25° C. environment at 0.1 C current to a rated end voltage, or repeating several times a discharging to a battery voltage of 1.0 V, making the current value during discharge be 1/100 or lower than the rated capacity. There is a case where a lithium ion remains even in the discharged state.

Next, the battery is disassembled in a glove box filled with argon, and the electrode is taken out and wash with an appropriate solvent. For example, ethyl methyl carbonate can be used as an appropriate solvent. If the washing of the electrode is insufficient, an impurity phase such as lithium carbonate and lithium fluoride may be mixed due to the influence of the lithium ion remaining in the electrode. In such a case, it is preferable to use an airtight container capable of performing measurement atmosphere in an inert gas. The washed electrode is cut so as to have the area approximately equal to the area of the holder of the powder X-ray diffractometer to obtain the measurement sample. The sample is directly attached to the glass holder to perform the measurement.

At this time, peaks derived from a metal foil serving as a current collector, a conductive agent, a binder, and the like are measured and grasped in advance using XRD. It is a matter of course that this operation can be omitted if such peaks can be grasped in advance. When the peak of the current collector and the peak of the active material overlap with each other, it is desirable to perform the measurement after peeling off the active material-containing layer from the current collector. This is in order to separate the overlapping peaks when quantitatively measuring the peak intensity. Although the active material-containing layer may be physically peeled off, peeling is easily performed when ultrasonic waves are applied in a solvent. When ultrasonic treatment is performed to peel off the active material-containing layer from the current collector, an electrode body powder (including the active material, the conductive agent, and the binder) can be collected by volatilizing the solvent. The powder X-ray diffraction measurement of the active material can be performed by filling for example, a Lindemann glass capillary or the like with the collected electrode body powder and performing the measurement. The electrode body powder collected by the ultrasonic treatment can also be subjected to various analysis other than the powder X-ray diffraction measurement.

In the obtained diffraction peaks, the peak intensity $I_A$ of the peak, attributed to the $Nb_2TiO_7$ phase having the maximum peak intensity within the range where 2θ is 26.0±0.1°, is determined. In addition, the peak intensity $I_B$ of the peak, attributed to at least one Nb-rich phase selected from the group consisting of the $Nb_{10}Ti_2O_{29}$ phase, the $Nb_{14}TiO_{37}$ phase, and the $Nb_{24}TiO_{64}$ phase having the maximum peak intensity within the range where 2θ is 24.9±0.2°, is determined. Then, the peak intensity ratio $I_B/I_A$ is calculated.

<TEM Observation of Electrode Material>

It is possible to confirm the distribution of each crystal in the material having the mixed phase according to the transmission electron microscope (TEM) observation.

In the TEM observation, it is desirable to embed a target sample powder in a resin or the like and to sharpen the interior of a specimen by mechanical polishing, ion milling, or the like. Further, similar processing can be performed even if the target sample is the electrode body. For example, a desired portion can be observed by embedding the electrode body directly in a resin, or the current collector (metal foil) can be peeled from the electrode body to observe the electrode powder where the conductive material and the binder are mixed. In this manner, it is possible to know how the two crystal phases are distributed in the primary particle and to know a gradient of a composition in the particle. That is, it is possible to confirm whether there is the concentration gradient of the $Nb_2TiO_7$ phase. Further, it is possible to confirm whether the $Nb_2TiO_7$ phase and the Nb-rich phase interpenetrate each other.

A specific example will be described hereinafter with reference to FIG. 3. FIG. 3 is a plan view schematically illustrating a particle to be measured. First, a gravity point of the particle to be measured is regarded as the center of the particle. Next, five measurement points are set at equal intervals on a straight line connecting the center of the particle and an arbitrary point on the particle surface. Multiwave interference images of particle parts at three points in a region orthogonal to each measurement point are investigated to observe an electron diffraction pattern. With this observation, it is possible to know a crystal structure included in the corresponding measurement point. For example, it is possible to easily distinguish the $Nb_2TiO_7$ phase, the $Nb_{10}Ti_2O_{29}$ phase, the $Nb_{14}TiO_{37}$ phase, and the $Nb_{24}TiO_{64}$ phase in addition to other phases by simulating an electron beam diffraction pattern in advance.

According to a first embodiment, an active material is provided. The active material includes an $Nb_2TiO_7$ phase and at least one Nb-rich phase selected from the group consisting of an $Nb_{10}Ti_2O_{29}$ phase, an $Nb_{14}TiO_{37}$ phase, and an $Nb_{24}TiO_{64}$ phase. The active material satisfies a peak intensity ratio represented by the following Formula (1).

$$0 < I_B/I_A \leq 0.25 \qquad (1)$$

In Formula (1), $I_A$ is a peak intensity of the maximum peak attributed to the $Nb_2TiO_7$ phase and appearing at 2θ of 26.0±0.1° in a wide angle X-ray diffraction pattern under CuKα rays as an X-ray source. $I_B$ is a peak intensity of the maximum peak attributed to the at least one Nb-rich phase and appearing at 2θ of 24.9±0.2° in the diffraction pattern. The active material can realize the secondary battery which can exhibit the excellent weight energy density, over-charge resistance, and cycle life characteristics.

Second Embodiment

According to the second embodiment, an electrode is provided.

The electrode according to the second embodiment includes the active material according to the first embodiment. This electrode may be a battery electrode containing the active material according to the first embodiment as an active material for a battery. The electrode as a battery electrode may be, for example, a negative electrode containing the active material according to the first embodiment as a negative electrode active material.

The electrode according to the second embodiment may include a current collector and an active material-containing layer. The active material-containing layer may be formed on both of reverse surfaces or one surface of the current collector. The active material-containing layer may contain the active material, and optionally an electro-conductive agent and a binder.

The active material-containing layer may singly include the active material according to the first embodiment or include two or more kinds of the active material according to the first embodiment. Furthermore, a mixture where one kind or two or more kinds of the active material according to the first embodiment is further mixed with one kind or two or more kinds of another active material may also be included.

For example, in a case where the active material according to the first embodiment is included as the negative electrode active material, examples of other active materials include lithium titanate having a ramsdellite structure (e.g., $Li_{2+y}Ti_3O_7$, $0<y\leq3$), lithium titanate having a spinel structure (e.g., $Li_{4+x}Ti_5O_{12}$, $0<x\leq3$), monoclinic titanium dioxide ($TiO_2$), anatase type titanium dioxide, rutile type titanium dioxide, a hollandite type titanium composite oxide, and an orthorhombic titanium-containing composite oxide.

Examples of the orthorhombic titanium-containing composite oxide include a compound represented by $Li_{2+a}M(I)_{2-b}Ti_{6-c}M(II)_dO_{14+\sigma}$. Here, M(I) is at least one selected from the group consisting of Sr, Ba, Ca, Mg, Na, Cs, Rb and K. M(II) is at least one selected from the group consisting of Zr, Sn, V, Nb, Ta, Mo, W, Y, Fe, Co, Cr, Mn, Ni and Al. The respective subscripts in the composition formula are specified as follows: $0\leq a\leq6$, $0\leq b<2$, $0\leq c<6$, $0\leq d<6$, and $-0.5\leq\sigma\leq0.5$. Specific examples of the orthorhombic titanium-containing composite oxide include $Li_{2+a}Na_2Ti_6O_{14}$ ($0\leq a\leq6$).

The electro-conductive agent is added to improve current collection performance and to suppress the contact resistance between the active material and the current collector. Examples of the electro-conductive agent include carbonaceous substances such as vapor grown carbon fiber (VGCF), carbon blacks such as acetylene black, and graphite. One of these may be used as the electro-conductive agent, or two or more may be used in combination as the electro-conductive agent. Alternatively, instead of using an electro-conductive agent, a carbon coating or an electro-conductive inorganic material coating may be applied to the surface of the active material particle.

The binder is added to fill gaps among the dispersed active material and also to bind the active material with the current collector. Examples of the binder include polytetrafluoroethylene (PTFE), polyvinylidene fluoride (PVdF), fluorine rubber, styrene-butadiene rubber, polyacrylate compounds, imide compounds, carboxymethyl cellulose (CMC), and salts of CMC. One of these may be used as the binder, or two or more may be used in combination as the binder.

The blending proportion of active material, electro-conductive agent and binder in the active material-containing layer may be appropriately changed according to the use of the electrode. For example, in the case of using the electrode as a negative electrode of a secondary battery, the active material (negative electrode active material), electro-conductive agent and binder in the active material-containing layer are preferably blended in proportions of 68% by mass to 96% by mass, 2% by mass to 30% by mass, and 2% by mass to 30% by mass, respectively. When the amount of electro-conductive agent is 2% by mass or more, the current collection performance of the active material-containing layer can be improved. When the amount of binder is 2% by mass or more, binding between the active material-containing layer and current collector is sufficient, and excellent cycling performances can be expected. On the other hand, an amount of each of the electro-conductive agent and binder is preferably 30% by mass or less, in view of increasing the capacity.

There may be used for the current collector, a material which is electrochemically stable at the potential (vs. Li/Li$^+$) at which lithium (Li) is inserted into and extracted from active material. For example in the case where the active material is used as a negative electrode active material, the current collector is preferably made of copper, nickel, stainless steel, aluminum, or an aluminum alloy including one or more elements selected from the group consisting of Mg, Ti, Zn, Mn, Fe, Cu, and Si. The thickness of the current collector is preferably from 5 μm to 20 μm. The current collector having such a thickness can maintain balance between the strength and weight reduction of the electrode.

The current collector may include a portion where the active material-containing layer is not formed on a surface of the current collector. This portion may serve as an electrode tab.

The electrode may be produced by the following method, for example. First, active material, electro-conductive agent, and binder are suspended in a solvent to prepare a slurry. The slurry is applied onto one surface or both of reverse surfaces of a current collector. Next, the applied slurry is dried to form a layered stack of active material-containing layer and current collector. Then, the layered stack is subjected to pressing. The electrode can be produced in this manner.

Alternatively, the electrode may also be produced by the following method. First, active material, electro-conductive agent, and binder are mixed to obtain a mixture. Next, the mixture is formed into pellets. Then the electrode can be obtained by arranging the pellets on the current collector.

According to a second embodiment, an electrode is provided. The electrode includes the active material according to the first embodiment. Therefore, the electrode can realize a secondary battery which can exhibit excellent weight energy density, over-charge resistance, and cycle life characteristics.

Third Embodiment

According to a third embodiment, there is provided a secondary battery including a negative electrode, a positive electrode, and an electrolyte. The secondary battery includes the electrode according to the second embodiment as the negative electrode. That is, the secondary battery according to the third embodiment includes, as the negative electrode, the electrode containing the active material according to the first embodiment as a battery active material.

The secondary battery according to the third embodiment may further include a separator provided between the positive electrode and the negative electrode. The negative electrode, the positive electrode, and the separator can structure an electrode group. The electrolyte may be held in the electrode group.

The secondary battery according to the third embodiment may further include a container member that houses the electrode group and the electrolyte.

The secondary battery according to the third embodiment may further include a negative electrode terminal electrically connected to the negative electrode and a positive electrode terminal electrically connected to the positive electrode.

The secondary battery according to the third embodiment may be, for example, a lithium ion secondary battery. The secondary battery also includes nonaqueous electrolyte secondary batteries containing nonaqueous electrolyte(s).

Hereinafter, the negative electrode, the positive electrode, the electrolyte, the separator, the container member, the negative electrode terminal, and the positive electrode terminal will be described in detail.

(1) Negative Electrode

The negative electrode may include a negative electrode current collector and a negative electrode active material-containing layer. The negative electrode current collector and the negative electrode active material-containing layer may be respectively a current collector and an active material-containing layer that may be included in the electrode according to the second embodiment. The negative electrode active material-containing layer contains the active material according to the first embodiment as a negative electrode active material.

Of the details of the negative electrode, parts overlapping with the details described in the second embodiment are omitted.

The density of the negative electrode active material-containing layer (excluding the current collector) is preferably from 1.8 g/cm$^3$ to 3.5 g/cm$^3$. The negative electrode, in which the density of the negative electrode active material-containing layer is within this range, is excellent in energy density and ability to hold the electrolyte. The density of the negative electrode active material-containing layer is more preferably from 2.5 g/cm$^3$ to 2.9 g/cm$^3$.

The negative electrode may be produced by a method similar to that for the electrode according to the second embodiment, for example.

(2) Positive Electrode

The positive electrode may include a positive electrode current collector and a positive electrode active material-containing layer. The positive electrode active material-containing layer may be formed on one surface or both of reverse surfaces of the positive electrode current collector. The positive electrode active material-containing layer may include a positive electrode active material, and optionally an electro-conductive agent and a binder.

As the positive electrode active material, for example, an oxide or a sulfide may be used. The positive electrode may singly include one kind of compound as the positive electrode active material, or alternatively, include two or more kinds of compounds in combination. Examples of the oxide and sulfide include compounds capable of having Li and Li ions be inserted and extracted.

Examples of such compounds include manganese dioxides ($MnO_2$), iron oxides, copper oxides, nickel oxides, lithium manganese composite oxides (e.g., $Li_xMn_2O_4$ or $Li_xMnO_2$; $0<x\le1$), lithium nickel composite oxides (e.g., $Li_xNiO_2$; $0<x\le1$), lithium cobalt composite oxides (e.g., $Li_xCoO_2$; $0<x\le1$), lithium nickel cobalt composite oxides (e.g., $Li_xNi_{1-y}Co_yO_2$; $0<x\le1$, $0<y<1$), lithium manganese cobalt composite oxides (e.g., $Li_xMn_yCo_{1-y}O_2$; $0<x\le1$, $0<y<1$), lithium manganese nickel composite oxides having a spinel structure (e.g., $Li_xMn_{2-y}Ni_yO_4$; $0<x\le1$, $0<y<2$), lithium phosphates having an olivine structure (e.g., $Li_xFePO_4$; $0<x\le1$, $Li_xFe_{1-y}Mn_yPO_4$; $0<x\le1$, $0<y<1$, and $Li_xCoPO_4$; $0<x\le1$), iron sulfates [$Fe_2(SO_4)_3$], vanadium oxides (e.g., $V_2O_5$), and lithium nickel cobalt manganese composite oxides ($Li_xNi_{1-y-z}Co_yMn_zO_2$; $0<x\le1$, $0<y<1$, $0<z<1$, $y+z<1$).

Among the above, examples of compounds more preferable as the positive electrode active material include lithium manganese composite oxides having a spinel structure (e.g., $Li_xMn_2O_4$; $0<x\le1$), lithium nickel composite oxides (e.g., $Li_xNiO_2$; $0<x\le1$), lithium cobalt composite oxides (e.g., $Li_xCoO_2$; $0<x\le1$), lithium nickel cobalt composite oxides (e.g., $Li_xNi_{1-y}Co_yO_2$; $0<x\le1$, $0<y<1$), lithium manganese nickel composite oxides having a spinel structure (e.g., $Li_xMn_{2-y}Ni_yO_4$; $0<x\le1$, $0<y<2$), lithium manganese cobalt composite oxides (e.g., $Li_xMn_1Co_{1-y}O_2$; $0<x\le1$, $0<y<1$), lithium iron phosphates (e.g., $Li_xFePO_4$; $0<x\le1$), and lithium nickel cobalt manganese composite oxides ($Li_xNi_{1-y-z}Co_yMn_zO_2$; $0<x\le1$, $0<y<1$, $0<z<1$, $y+z<1$). The positive electrode potential can be made high by using these positive electrode active materials.

When a room temperature molten salt is used as the electrolyte of the battery, it is preferable to use a positive electrode active material including lithium iron phosphate, $Li_xVPO_4F$ ($0\le x\le1$), lithium manganese composite oxide, lithium nickel composite oxide, lithium nickel cobalt composite oxide, or a mixture thereof. Since these compounds have low reactivity with room temperature molten salts, cycle life can be improved. Details regarding the room temperature molten salt are described later.

The primary particle size of the positive electrode active material is preferably from 100 nm to 1 μm. The positive electrode active material having a primary particle size of 100 nm or more is easy to handle during industrial production. In the positive electrode active material having a primary particle size of 1 μm or less, diffusion of lithium ions within solid can proceed smoothly.

The specific surface area of the positive electrode active material is preferably from 0.1 m$^2$/g to 10 m$^2$/g. The positive electrode active material having a specific surface area of 0.1 m$^2$/g or more can secure sufficient sites for inserting and extracting Li ions. The positive electrode active material having a specific surface area of 10 m$^2$/g or less is easy to handle during industrial production, and can secure a good charge and discharge cycle performance.

The binder is added to fill gaps among the dispersed positive electrode active material and also to bind the positive electrode active material with the positive electrode current collector. Examples of the binder include polytetrafluoroethylene (PTFE), polyvinylidene fluoride (PVdF), fluorine rubber, polyacrylate compounds, imide compounds, carboxymethyl cellulose (CMC), and salts of CMC. One of these may be used as the binder, or two or more may be used in combination as the binder.

The electro-conductive agent is added to improve current collection performance and to suppress the contact resistance between the positive electrode active material and the positive electrode current collector. Examples of the electro-conductive agent include carbonaceous substances such as vapor grown carbon fiber (VGCF), carbon black such as acetylene black, and graphite. One of these may be used as the electro-conductive agent, or two or more may be used in combination as the electro-conductive agent.

The electro-conductive agent may be omitted.

In the positive electrode active material-containing layer, the positive electrode active material and binder are preferably blended in proportions of 80% by mass to 98% by mass, and 2% by mass to 20% by mass, respectively.

When the amount of the binder is 2% by mass or more, sufficient electrode strength can be achieved. The binder may serve as an electrical insulator. Thus, when the amount of the binder is 20% by mass or less, the amount of insulator in the electrode is reduced, and thereby the internal resistance can be decreased.

When an electro-conductive agent is added, the positive electrode active material, binder, and electro-conductive agent are preferably blended in proportions of 77% by mass to 95% by mass, 2% by mass to 20% by mass, and 3% by mass to 15% by mass, respectively.

When the amount of the electro-conductive agent is 3% by mass or more, the above-described effects can be expressed. By setting the amount of the electro-conductive agent to 15% by mass or less, the proportion of electro-conductive agent that contacts the electrolyte can be made low. When this proportion is low, the decomposition of an electrolyte can be reduced during storage under high temperatures.

The positive electrode current collector is preferably an aluminum foil, or an aluminum alloy foil containing one or more elements selected from the group consisting of Mg, Ti, Zn, Ni, Cr, Mn, Fe, Cu, and Si.

The thickness of the aluminum foil or aluminum alloy foil is preferably from 5 µm to 20 µm, and more preferably 15 µm or less. The purity of the aluminum foil is preferably 99% by mass or more. The amount of transition metal such as iron, copper, nickel, or chromium contained in the aluminum foil or aluminum alloy foil is preferably 1% by mass or less.

The positive electrode current collector may include a portion where a positive electrode active material-containing layer is not formed on a surface of the positive electrode current collector. This portion may serve as a positive electrode tab.

The positive electrode may be produced by a method similar to that for the electrode according to the second embodiment, for example, using a positive electrode active material.

(3) Electrolyte

As the electrolyte, for example, a liquid nonaqueous electrolyte or gel nonaqueous electrolyte may be used. The liquid nonaqueous electrolyte is prepared by dissolving an electrolyte salt as solute in an organic solvent. The concentration of electrolyte salt is preferably from 0.5 mol/L to 2.5 mol/L.

Examples of the electrolyte salt include lithium salts such as lithium perchlorate (LiClO$_4$), lithium hexafluorophosphate (LiPF$_6$), lithium tetrafluoroborate (LiBF$_4$), lithium hexafluoroarsenate (LiAsF), lithium trifluoromethanesulfonate (LiCF$_3$SO$_3$), and lithium bistrifluoromethylsulfonylimide [LiN(CF$_3$SO$_2$)$_2$], and mixtures thereof. The electrolyte salt is preferably resistant to oxidation even at a high potential, and most preferably LiPF$_6$.

Examples of the organic solvent include cyclic carbonates such as propylene carbonate (PC), ethylene carbonate (EC), or vinylene carbonate (VC); linear carbonates such as diethyl carbonate (DEC), dimethyl carbonate (DMC), or methyl ethyl carbonate (MEC); cyclic ethers such as tetrahydrofuran (THF), 2-methyl tetrahydrofuran (2-MeTHF), or dioxolane (DOX); linear ethers such as dimethoxy ethane (DME) or diethoxy ethane (DEE); γ-butyrolactone (GBL), acetonitrile (AN), and sulfolane (SL). These organic solvents may be used singularly or as a mixed solvent.

The gel nonaqueous electrolyte is prepared by obtaining a composite of a liquid nonaqueous electrolyte and a polymeric material. Examples of the polymeric material include polyvinylidene fluoride (PVdF), polyacrylonitrile (PAN), polyethylene oxide (PEO), and mixtures thereof.

Alternatively, other than the liquid nonaqueous electrolyte and gel nonaqueous electrolyte, a room temperature molten salt (ionic melt) including lithium ions, a polymer solid electrolyte, an inorganic solid electrolyte, or the like may be used as the nonaqueous electrolyte.

The room temperature molten salt (ionic melt) indicates compounds among organic salts made of combinations of organic cations and anions, which are able to exist in a liquid state at room temperature (15° C. to 25° C.). The room temperature molten salt includes a room temperature molten salt which exists alone as a liquid, a room temperature molten salt which becomes a liquid upon mixing with an electrolyte salt, a room temperature molten salt which becomes a liquid when dissolved in an organic solvent, and mixtures thereof. In general, the melting point of the room temperature molten salt used in secondary batteries is 25° C. or below. The organic cations generally have a quaternary ammonium framework.

The polymer solid electrolyte is prepared by dissolving the electrolyte salt in a polymeric material, and solidifying it.

The inorganic solid electrolyte is a solid substance having Li ion conductivity.

(4) Separator

The separator may be made of, for example, a porous film or synthetic resin nonwoven fabric including polyethylene (PE), polypropylene (PP), cellulose, or polyvinylidene fluoride (PVdF). In view of safety, a porous film made of polyethylene or polypropylene is preferred.

This is because such a porous film melts at a fixed temperature and thus able to shut off current.

(5) Container Member

As the container member, for example, a container made of laminate film or a container made of metal may be used.

The thickness of the laminate film is, for example, 0.5 mm or less, and preferably 0.2 mm or less.

As the laminate film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. The laminate film may be formed into the shape of a container member, by heat-sealing.

The wall thickness of the metal container is, for example, 1 mm or less, more preferably 0.5 mm or less, and still more preferably 0.2 mm or less.

The metal case is made, for example, of aluminum or an aluminum alloy. The aluminum alloy preferably contains elements such as magnesium, zinc, or silicon. If the aluminum alloy contains a transition metal such as iron, copper, nickel, or chromium, the content thereof is preferably 100 ppm by mass or less.

The shape of the container member is not particularly limited. The shape of the container member may be, for example, flat (thin), square, cylinder, coin, or button-shaped. The container member may be appropriately selected depending on battery size and use of the battery.

(6) Negative Electrode Terminal

The negative electrode terminal may be made of a material that is electrochemically stable at the potential at which Li is inserted into and extracted from the above-described negative electrode active material, and has electrical conductivity. Specific examples of the material for the negative electrode terminal include copper, nickel, stainless steel, aluminum, and aluminum alloy containing at least one element selected from the group consisting of Mg, Ti, Zn, Mn, Fe, Cu, and Si. Aluminum or aluminum alloy is preferred as the material for the negative electrode terminal. The negative electrode terminal is preferably made of the same material as the negative electrode current collector, in order to reduce the contact resistance with the negative electrode current collector.

(7) Positive Electrode Terminal

The positive electrode terminal may be made of, for example, a material that is electrically stable in the potential range of 3 V to 5 V (vs. Li/Li$^+$) relative to the redox potential of lithium, and has electrical conductivity. Examples of the material for the positive electrode terminal include aluminum and an aluminum alloy containing one or more selected from the group consisting of Mg, Ti, Zn, Mn, Fe, Cu, and Si. The positive electrode terminal is preferably made of the same material as the positive electrode current collector, in order to reduce contact resistance with the positive electrode current collector.

Next, the secondary battery according to the third embodiment will be more specifically described with reference to the drawings.

FIG. 4 is a cross-sectional view schematically showing an example of a secondary battery according to the third embodiment. FIG. 5 is an enlarged cross-sectional view of section A of the secondary battery shown in FIG. 4.

The secondary battery 100 shown in FIGS. 4 and 5 includes a bag-shaped container member 2 shown in FIGS. 4 and 5, an electrode group 1 shown in FIG. 4, and an electrolyte, which is not shown. The electrode group 1 and the electrolyte are housed in the bag-shaped container member 2. The electrolyte (not shown) is held in the electrode group 1.

The bag-shaped container member 2 is made of a laminate film including two resin layers and a metal layer sandwiched between the resin layers.

As shown in FIG. 4, the electrode group 1 is a wound electrode group in a flat form. The wound electrode group 1 in a flat form includes a negative electrode 3, a separator 4, and a positive electrode 5, as shown in FIG. 5. The separator 4 is sandwiched between the negative electrode 3 and the positive electrode 5.

The negative electrode 3 includes a negative electrode current collector 3a and a negative electrode active material-containing layer 3b. At the portion of the negative electrode 3 positioned outermost among the wound electrode group 1, the negative electrode active material-containing layer 3b is formed only on an inner surface of the negative electrode current collector 3a, as shown in FIG. 4. For the other portions of the negative electrode 3, negative electrode active material-containing layers 3b are formed on both of reverse surfaces of the negative electrode current collector 3a.

The positive electrode 5 includes a positive electrode current collector 5a and positive electrode active material-containing layers 5b formed on both of reverse surfaces of the positive electrode current collector 5a.

As shown in FIG. 4, a negative electrode terminal 6 and positive electrode terminal 7 are positioned in vicinity of the outer peripheral edge of the wound electrode group 1. The negative electrode terminal 6 is connected to a portion of the negative electrode current collector 3a positioned outermost. The positive electrode terminal 7 is connected to a portion of the positive electrode current collector 5a positioned outermost. The negative electrode terminal 6 and the positive electrode terminal 7 extend out from an opening of the bag-shaped container member 2. A thermoplastic resin layer is provided on the inner surface of the bag-shaped container member 2, and the opening is sealed by heat-sealing the resin layer.

Figure 6:
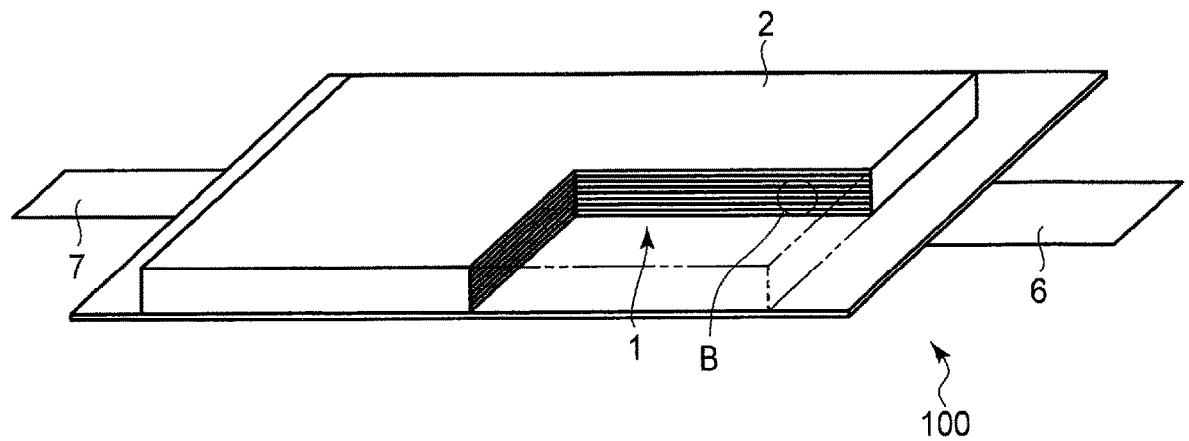
FIG. 6 is a partially cut-out perspective view schematically illustrating another example of the secondary battery according to the embodiment.
Figure 7:
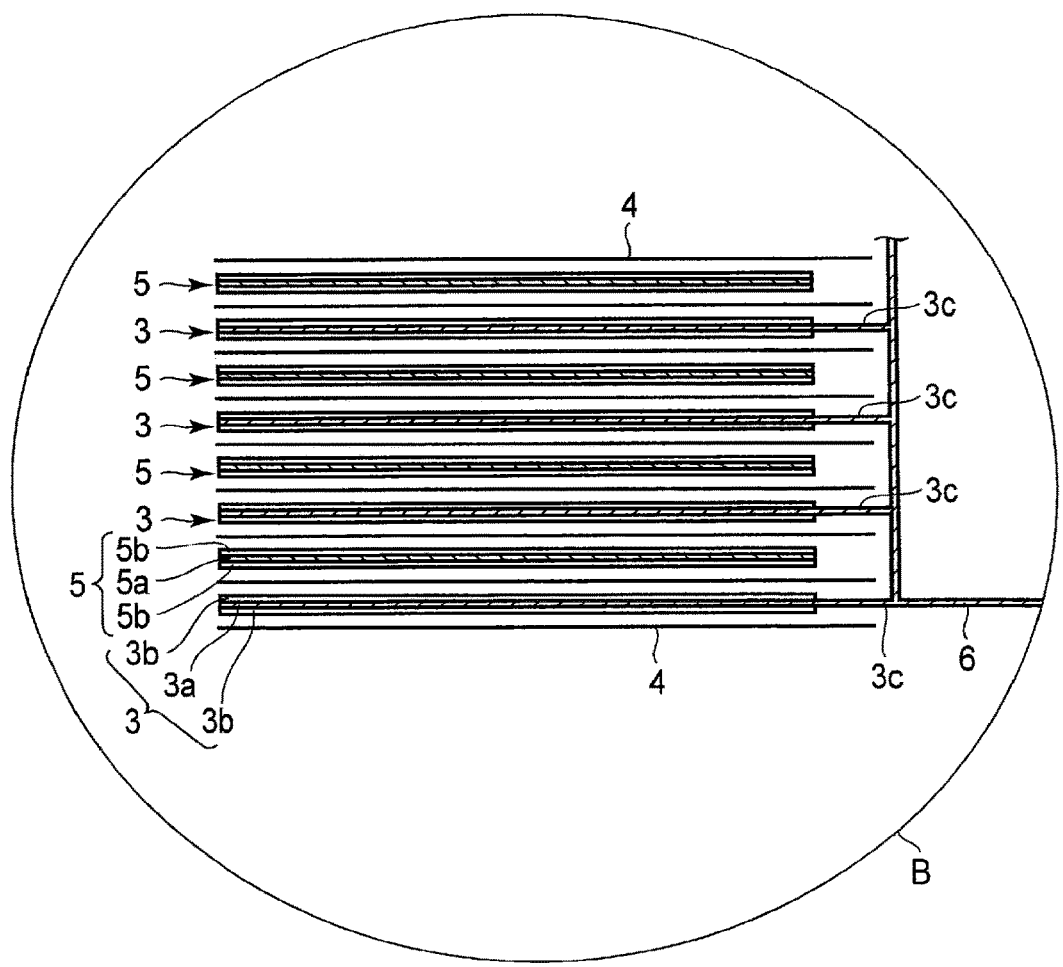
FIG. 7 is an enlarged cross-sectional view of a section B of the secondary battery illustrated in FIG. 6.

The secondary battery according to the third embodiment is not limited to the secondary battery of the structure shown in FIGS. 4 and 5, and may be, for example, a battery of a structure as shown in FIGS. 6 and 7.

FIG. 6 is a partially cut-out perspective view schematically showing another example of a secondary battery according to the third embodiment. FIG. 7 is an enlarged cross-sectional view of section B of the secondary battery shown in FIG. 6.

The secondary battery 100 shown in FIGS. 6 and 7 includes an electrode group 1 shown in FIGS. 6 and 7, a container member 2 shown in FIG. 6, and an electrolyte, which is not shown. The electrode group 1 and the electrolyte are housed in the container member 2. The electrolyte is held in the electrode group 1.

The container member 2 is made of a laminate film including two resin layers and a metal layer sandwiched between the resin layers.

As shown in FIG. 7, the electrode group 1 is a stacked electrode group. The stacked electrode group 1 has a structure in which and negative electrodes 3 and positive electrodes 5 are alternately stacked with separator(s) 4 sandwiched therebetween.

The electrode group 1 includes plural negative electrodes 3. Each of the negative electrodes 3 includes the negative electrode current collector 3a and the negative electrode active material-containing layers 3b supported on both surfaces of the negative electrode current collector 3a. The electrode group 1 further includes plural positive electrodes 5. Each of the positive electrodes 5 includes the positive electrode current collector 5a and the positive electrode active material-containing layers 5b supported on both surfaces of the positive electrode current collector 5a.

The negative electrode current collector 3a of each of the negative electrodes 3 includes at one end, a portion 3c where the negative electrode active material-containing layer 3b is not supported on either surface. This portion 3c serves as a negative electrode tab. As shown in FIG. 7, the portions 3c serving as the negative electrode tabs do not overlap the positive electrodes 5. The plural negative electrode tabs (portions 3c) are electrically connected to the strip-shaped negative electrode terminal 6. A tip of the strip-shaped negative electrode terminal 6 is drawn to the outside from the container member 2.

Although not shown, the positive electrode current collector 5a of each of the positive electrodes 5 includes at one end, a portion where the positive electrode active material-containing layer 5b is not supported on either surface. This portion serves as a positive electrode tab. Like the negative electrode tabs (portion 3c), the positive electrode tabs do not overlap the negative electrodes 3.

Further, the positive electrode tabs are located on the opposite side of the electrode group 1 with respect to the negative electrode tabs (portion 3c). The positive electrode tabs are electrically connected to the strip-shaped positive electrode terminal 7. A tip of the strip-shaped positive electrode terminal 7 is located on the opposite side relative to the negative electrode terminal 6 and drawn to the outside from the container member 2.

The secondary battery according to the third embodiment includes the active material according to the first embodiment as a negative electrode active material. Thus, this secondary battery can exhibit excellent weight energy density, over-charge resistance, and cycle life characteristics.

Fourth Embodiment

According to a fourth embodiment, a battery module is provided. The battery module according to the fourth embodiment includes plural secondary batteries according to the third embodiment.

In the battery module according to the fourth embodiment, each of the single batteries may be arranged electrically connected in series, in parallel, or in a combination of in-series connection and in-parallel connection.

An example of the battery module according to the fourth embodiment will be described next with reference to the drawings.

FIG. 8 is a perspective view schematically showing an example of the battery module according to the fourth embodiment. A battery module 200 shown in FIG. 8 includes five single-batteries 100a to 100e, four bus bars 21, a positive electrode-side lead 22, and a negative electrode-side lead 23. Each of the five single-batteries 100a to 100e is a secondary battery according to the third embodiment.

The bus bar 21 connects, for example, a negative electrode terminal 6 of one single-battery 100a and a positive electrode terminal 7 of the single-battery 100b positioned adjacent. In such a manner, five single-batteries 100 are thus connected in series by the four bus bars 21. That is, the battery module 200 shown in FIG. 8 is a battery module of five in-series connection.

As shown in FIG. 8, the positive electrode terminal 7 of the single-battery 100a located at left end among the five single-batteries 100a to 100e is connected to the positive electrode-side lead 22 for external connection. In addition, the negative electrode terminal 6 of the single-battery 100e located at the right end among the five single-batteries 100a to 100e is connected to the negative electrode-side lead 23 for external connection.

The battery module according to the fourth embodiment includes the secondary battery according to the third embodiment. Therefore, the battery module can exhibit excellent weight energy density, over-charge resistance, and cycle life characteristics.

Fifth Embodiment

According to a fifth embodiment, a battery pack is provided. The battery pack includes a battery module according to the fourth embodiment. The battery pack may include a single secondary battery according to the third embodiment, in place of the battery module according to the fourth embodiment.

The battery pack according to the fifth embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the fifth embodiment may further include an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of motive force of vehicles such as automobiles) is provided to the battery pack via the external power distribution terminal.

Next, an example of a battery pack according to the fifth embodiment will be described with reference to the drawings.

Figure 9:
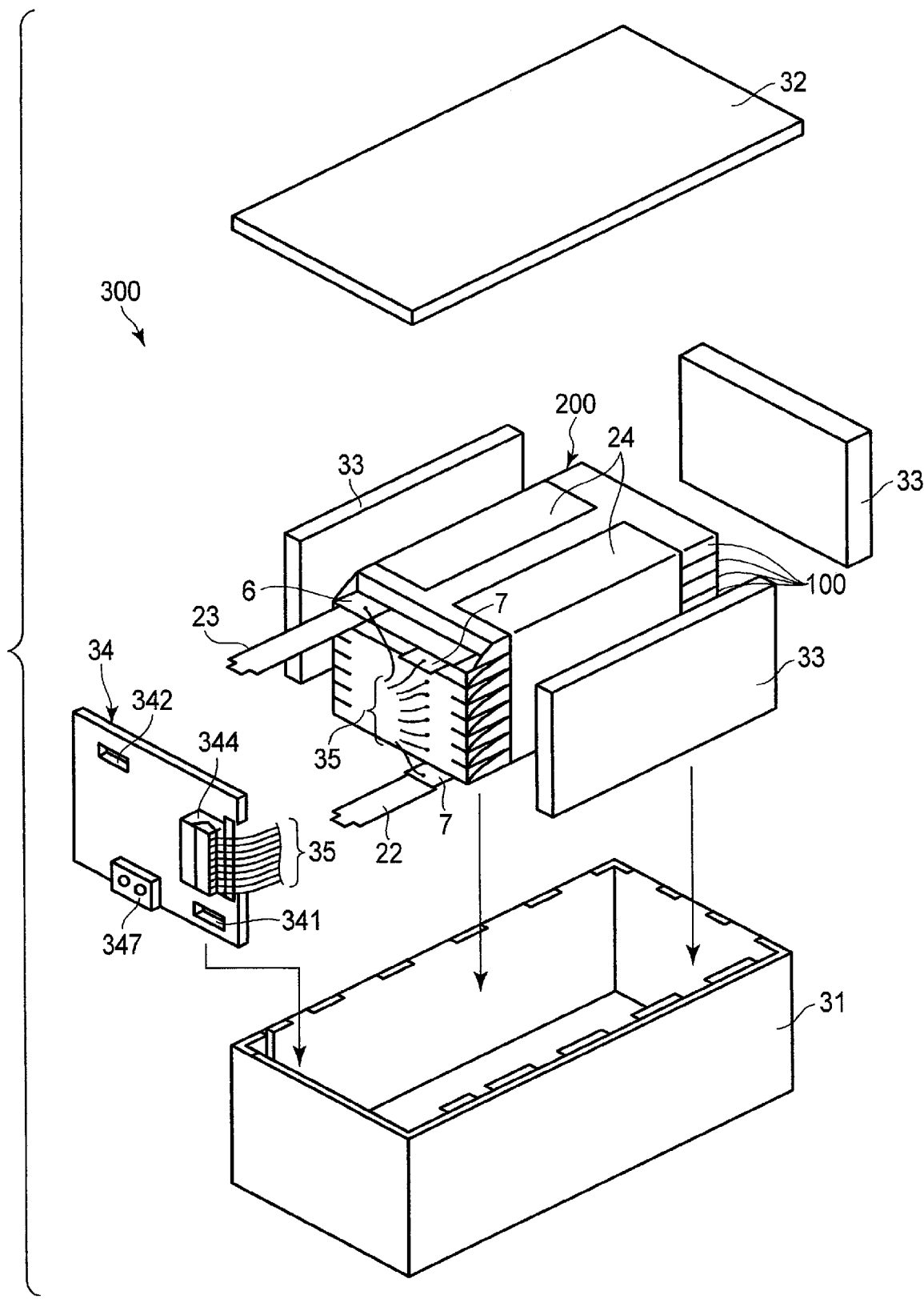
FIG. 9 is an exploded perspective view schematically illustrating an example of a battery pack according to an embodiment.

FIG. 9 is an exploded perspective view schematically showing an example of the battery pack according to the fifth embodiment. FIG. 10 is a block diagram showing an example of an electric circuit of the battery pack shown in FIG. 9.

A battery pack 300 shown in FIGS. 9 and 10 includes a housing container 31, a lid 32, protective sheets 33, a battery module 200, a printed wiring board 34, wires 35, and an insulating plate (not shown).

The housing container 31 shown in FIG. 9 is a square bottomed container having a rectangular bottom surface. The housing container 31 is configured to be capable of storing the protection sheets 33, the battery module 200, the printed wiring board 34, and the wires 35. The lid 32 has a rectangular shape. The lid 32 covers the housing container 31 to house the battery module 200 and such. The housing container 31 and the lid 32 are provided with openings, connection terminals, or the like (not shown) for connection to an external device or the like.

The battery module 200 includes plural single-batteries 100, a positive electrode-side lead 22, a negative electrode-side lead 23, and adhesive tape(s) 24.

A single-battery 100 has a structure shown in FIGS. 4 and 5. At least one of the plural single-batteries 100 is a secondary battery according to the third embodiment. The plural single-batteries 100 are stacked such that the negative electrode terminals 6 and the positive electrode terminals 7, which extend outside, are directed toward the same direction. The plural single-batteries 100 are electrically connected in series, as shown in FIG. 9. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape(s) 24 fastens the plural single-batteries 100. The plural single-batteries 100 may be fixed using a heat-shrinkable tape in place of the adhesive tape(s) 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural single-batteries 100.

One end of the positive electrode-side lead 22 is connected to the positive electrode terminal 7 of the single-battery 100 located lowermost in the stack of the single-batteries 100. One end of the negative electrode-side lead 23 is connected to the negative electrode terminal 6 of the single-battery 100 located uppermost in the stack of the single-batteries 100.

The printed wiring board 34 is provided along one face in the short-side direction among the inner surfaces of the housing container 31. The printed wiring board 34 includes a positive electrode-side connector 341, a negative electrode-side connector 342, a thermistor 343, a protective circuit 344, wirings 345 and 346, an external power distribution terminal 347, a plus-side (positive-side) wire 348a, and a minus-side (negative-side) wire 348b. One principal surface of the printed wiring board 34 faces the surface of the battery module 200 from which the negative electrode terminals 6 and the positive electrode terminals 7 extend out. An insulating plate (not shown) is disposed in between the printed wiring board 34 and the battery module 200.

The positive electrode-side connector 341 is provided with a through hole. By inserting the other end of the positive electrode-side lead 22 into the though hole, the positive electrode-side connector 341 and the positive electrode-side lead 22 become electrically connected. The negative electrode-side connector 342 is provided with a through hole. By inserting the other end of the negative electrode-side lead 23 into the though hole, the negative electrode-side connector 342 and the negative electrode-side lead 23 become electrically connected.

The thermistor 343 is fixed to one principal surface of the printed wiring board 34. The thermistor 343 detects the temperature of each single-battery 100 and transmits detection signals to the protective circuit 344.

The external power distribution terminal 347 is fixed to the other principal surface of the printed wiring board 34. The external power distribution terminal 347 is electrically connected to device(s) that exists outside the battery pack 300.

The protective circuit 344 is fixed to the other principal surface of the printed wiring board 34. The protective circuit 344 is connected to the external power distribution terminal 347 via the plus-side wire 348a. The protective circuit 344 is connected to the external power distribution terminal 347 via the minus-side wire 348b. In addition, the protective circuit 344 is electrically connected to the positive electrode-side connector 341 via the wiring 345. The protective circuit 344 is electrically connected to the negative electrode-side connector 342 via the wiring 346. Furthermore, the protective circuit 344 is electrically connected to each of the plural single-batteries 100 via the wires 35.

The protective sheets 33 are arranged on both inner surfaces of the housing container 31 along the long-side direction and on the inner surface along the short-side direction facing the printed wiring board 34 across the battery module 200 positioned therebetween. The protective sheets 33 are made of, for example, resin or rubber.

The protective circuit 344 controls charge and discharge of the plural single-batteries 100. The protective circuit 344 is also configured to cut-off electric connection between the protective circuit 344 and the external power distribution terminal 347 to external device(s), based on detection signals transmitted from the thermistor 343 or detection signals transmitted from each single-battery 100 or the battery module 200.

An example of the detection signal transmitted from the thermistor 343 is a signal indicating that the temperature of the single-battery (single-batteries) 100 is detected to be a predetermined temperature or more. An example of the detection signal transmitted from each single-battery 100 or the battery module 200 include a signal indicating detection of over-charge, over-discharge, and overcurrent of the single-battery (single-batteries) 100. When detecting over-charge or the like for each of the single batteries 100, the battery voltage may be detected, or a positive electrode potential or negative electrode potential may be detected. In the latter case, a lithium electrode to be used as a reference electrode may be inserted into each single battery 100.

Note, that as the protective circuit 344, a circuit included in a device (for example, an electronic device or an automobile) that uses the battery pack 300 as a power source may be used.

As described above, the battery pack 300 includes the external power distribution terminal 347. Hence, the battery pack 300 can output current from the battery module 200 to an external device and input current from an external device to the battery module 200 via the external power distribution terminal 347. In other words, when using the battery pack 300 as a power source, the current from the battery module 200 is supplied to an external device via the external power distribution terminal 347. When charging the battery pack 300, a charge current from an external device is supplied to the battery pack 300 via the external power distribution terminal 347. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may be used as the external power distribution terminal.

Such a battery pack 300 is used, for example, in applications where excellent cycle performance is demanded when a large current is extracted. More specifically, the battery pack 300 is used as, for example, a power source for electronic devices, a stationary battery, or an onboard battery for various kinds of vehicles. An example of the electronic device is a digital camera. The battery pack 300 is particularly favorably used as an onboard battery.

The battery pack according to the fifth embodiment includes the secondary battery according to the third embodiment or the battery module according to the fourth embodiment. Therefore, the battery pack can exhibit excellent weight energy density, over-charge resistance, and cycle life characteristics.

Sixth Embodiment

According to a sixth embodiment, a vehicle is provided. The battery pack according to the fifth embodiment is installed on this vehicle.

In the vehicle according to the sixth embodiment, the battery pack is configured, for example, to recover regenerative energy from motive force of the vehicle. The vehicle may include a mechanism configured to convert kinetic energy of the vehicle into regenerative energy.

Examples of the vehicle according to the sixth embodiment include two-wheeled to four-wheeled hybrid electric automobiles, two-wheeled to four-wheeled electric automobiles, electrically assisted bicycles, and railway cars.

In the vehicle according to the sixth embodiment, the installing position of the battery pack is not particularly limited. For example, the battery pack may be installed in the engine compartment of the vehicle, in rear parts of the vehicle, or under seats.

The vehicle according to the sixth embodiment may have plural battery packs installed. In such a case, the battery packs may be electrically connected in series, electrically connected in parallel, or electrically connected in a combination of in-series connection and in-parallel connection.

An example of the vehicle according to the sixth embodiment is explained below, with reference to the drawings.

FIG. 11 is a cross-sectional view schematically showing an example of a vehicle according to the sixth embodiment.

A vehicle 400, shown in FIG. 11 includes a vehicle body 40 and a battery pack 300 according to the fifth embodiment. In the example shown in FIG. 11, the vehicle 400 is a four-wheeled automobile.

The vehicle 400 may have plural battery packs 300 installed. In such a case, the battery packs 300 may be connected in series, connected in parallel, or connected in a combination of in-series connection and in-parallel connection.

In FIG. 11, the battery pack 300 is installed in an engine compartment located at the front of the vehicle body 40. As mentioned above, for example, the battery pack 300 may be alternatively installed in rear sections of the vehicle body 40, or under a seat. The battery pack 300 may be used as a power source of the vehicle 400. The battery pack 300 can also recover regenerative energy of motive force of the vehicle 400.

Next, with reference to FIG. 12, an aspect of operation of the vehicle according to the sixth embodiment is explained.

FIG. 12 is a view schematically showing another example of the vehicle according to the sixth embodiment. A vehicle 400, shown in FIG. 12, is an electric automobile.

The vehicle 400, shown in FIG. 12, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 12, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

The three battery packs 300a, 300b and 300c are electrically connected in series. The battery pack 300a includes a battery module 200a and a battery module monitoring unit 301a (e.g., a VTM: voltage temperature monitoring). The battery pack 300b includes a battery module 200b, and a battery module monitoring unit 301b. The battery pack 300c includes a battery module 200c, and a battery module monitoring unit 301c. The battery packs 300a, 300b and 300c can each be independently removed, and may be exchanged by a different battery pack 300.

Each of the battery modules 200a to 200c includes plural single-batteries connected in series. At least one of the plural single-batteries is the secondary battery according to the third embodiment. The battery modules 200a to 200c each perform charging and discharging via a positive electrode terminal 413 and a negative electrode terminal 414.

In order to collect information concerning security of the vehicle power source 41, the battery management unit 411 performs communication with the battery module monitoring units 301a to 301c and collects information such as voltages or temperatures of the single-batteries 100 included in the battery modules 200a to 200c included in the vehicle power source 41.

The communication bus 412 is connected between the battery management unit 411 and the battery module monitoring units 301a to 301c. The communication bus 412 is configured so that multiple nodes (i.e., the battery management unit and one or more battery module monitoring units) share a set of communication lines. The communication bus 412 is, for example, a communication bus configured based on CAN (Control Area Network) standard.

The battery module monitoring units 301a to 301c measure a voltage and a temperature of each single-battery in the battery modules 200a to 200c based on commands from the battery management unit 411. It is possible, however, to measure the temperatures only at several points per battery module, and the temperatures of all of the single-batteries need not be measured.

The vehicle power source 41 may also have an electromagnetic contactor (for example, a switch unit 415 shown in FIG. 12) for switching connection between the positive electrode terminal 413 and the negative electrode terminal 414. The switch unit 415 includes a precharge switch (not shown), which is turned on when the battery modules 200a to 200c are charged, and a main switch (not shown), which is turned on when battery output is supplied to a load. The precharge switch and the main switch include a relay circuit (not shown), which is turned on or off based on a signal provided to a coil disposed near the switch elements.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 controls an output voltage based on control signals from the battery management unit 411 or the vehicle ECU 42, which controls the entire operation of the vehicle.

The drive motor 45 is rotated by electric power supplied from the inverter 44. The rotation is transferred to an axle and driving wheels W via a differential gear unit, for example.

The vehicle 400 also includes a regenerative brake mechanism, though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The direct current is inputted into the vehicle power source 41.

One terminal of a connecting line L1 is connected via a current detector (not shown) in the battery management unit 411 to the negative electrode terminal 414 of the vehicle power source 41. The other terminal of the connecting line L1 is connected to a negative electrode input terminal of the inverter 44.

One terminal of a connecting line L2 is connected via the switch unit 415 to the positive electrode terminal 413 of the vehicle power source 41. The other terminal of the connecting line L2 is connected to a positive electrode input terminal of the inverter 44.

The external terminal 43 is connected to the battery management unit 411. The external terminal 43 is able to connect, for example, to an external power source.

The vehicle ECU 42 cooperatively controls the battery management unit 411 together with other units in response to inputs operated by a driver or the like, thereby performing the management of the whole vehicle. Data concerning the security of the vehicle power source 41, such as a remaining capacity of the vehicle power source 41, are transferred between the battery management unit 411 and the vehicle ECU 42 via communication lines.

The vehicle according to the sixth embodiment includes the battery pack according to the fifth embodiment.

Therefore, it is possible to provide the vehicle including the battery pack, which can exhibit excellent weight energy density, over-charge resistance, and cycle life characteristics, mounted thereon according to the present embodiment.

EXAMPLES

Hereinafter, the above embodiment will be described in more detail based on examples.
<Synthesis Method>

Example 1

A niobium-titanium composite oxide was synthesized by a solid phase synthesis method to be described hereinafter.

First, in order to obtain $Nb_2TiO_7$, $Nb_2O_5$ particles and $TiO_2$ particles were prepared so that the molar ratio of 1:1, then mixing was performed in a dry ball mill. The obtained powder was placed in an alumina crucible and subjected to pre-firing (first firing) at a temperature of 800° C. for 12 hours. After the pre-firing, the obtained powder was placed in a platinum crucible and subjected to main firing at 1200° C. for 5 hours. After the main firing, the powder was crushed and mixed in an agate mortar, and coarse particles were removed through a 25 μm mesh sieve to obtain the $Nb_2TiO_7$ phase. The obtained niobium-titanium composite oxide contained only primary particles of a single phase of the $Nb_2TiO_7$ phase.

Next, a solid phase synthesis method was performed in the same manner as the synthesis of the above $Nb_2TiO_7$ phase, except that the molar ratio of $Nb_2O_5$ particles to $TiO_2$ particles was set to 2.5:1 in order to obtain the $Nb_{10}Ti_2O_{29}$ phase. The obtained niobium-titanium composite oxide contained only primary particles of a single phase of the $Nb_{10}Ti_2O_{29}$ phase.

The primary particles of the single phase of the $Nb_{10}Ti_2O_{29}$ phase were mixed with the primary particles of the single phase of the $Nb_2TiO_7$ phase at a weight ratio of 0.5% by weight to obtain an active material according to Example 1.

Example 2

An active material was obtained by the method described in Example 1, except that primary particles of a single phase of an $Nb_{14}TiO_{37}$ phase were mixed in a weight ratio of 0.5% by weight relative to primary particles of a single phase of an $Nb_2TiO_7$ phase.

The primary particles of the single phase of the $Nb_{14}TiO_{37}$ phase were synthesized in the same manner as in the synthesis of the $Nb_2TiO_7$ phase according to Example 1, except that a molar ratio of $Nb_2O_5$ particles to $TiO_2$ particles was set to 14:1.

Example 3

An active material was obtained by the method described in Example 1, except that primary particles of a single phase of an $Nb_{24}TiO_{64}$ phase were mixed in a weight ratio of 0.5% by weight relative to primary particles of a single phase of an $Nb_2TiO_7$ phase.

The primary particles of the single phase of the $Nb_{24}TiO_{64}$ phase were synthesized in the same manner as in the synthesis of the $Nb_2TiO_7$ phase according to Example 1, except that a molar ratio of $Nb_2O_5$ particles to $TiO_2$ particles was set to 24:1.

Example 4

The primary particles of the single phase of $Nb_2TiO_7$ phase synthesized in Example 1 was mixed with the primary particles of the single phase of the $Nb_{10}Ti_2O_{29}$ phase synthesized in Example 1 at a weight ratio of 0.1% by weight to obtain an active material according to Example 4.

Example 5

A niobium-titanium composite oxide was synthesized by the following method.

$Nb_2O_5$ particles having an average particle size D50 of 25 μm and $TiO_2$ particles having an average particle size D50 of 1.0 μm were used as starting materials. The average particle size D50 is a particle size at the time when a volume frequency, measured by a laser diffraction and scattering type particle size distribution measuring device (Microtrac MT33-EXII, Nikkiso Co., Ltd.), is 50%.

When there is a particle size difference between the $Nb_2O_5$ particle and the $TiO_2$ particle used as the raw materials in this manner, atoms are not sufficiently diffused at the time of firing in the solid phase synthesis method, and thus, a shell part and a core part surrounded by the shell part are formed. The shell part is formed of an $Nb_2TiO_7$ phase having a small Nb/Ti ratio, the core part is formed of an Nb-rich phase having a large Nb/Ti ratio, that is, at least one crystal phase selected from the group consisting of an $Nb_{10}Ti_2O_{29}$ phase, an $Nb_{14}TiO_{37}$ phase, and an $Nb_{24}TiO_{64}$ phase.

$Nb_2O_5$ particles and the $TiO_2$ particles were prepared so that the molar ratio of 1.05:1, then mixing was performed in a dry ball mill. The obtained powder was placed in an alumina crucible and subjected to pre-firing (first firing) at a temperature of 800° C. for 12 hours. After the pre-firing, the obtained powder was placed in a platinum crucible and subjected to main firing at 1000° C. for 5 hours. After main firing, the powder was crushed and mixed in an agate mortar, and coarse particles were removed through a 25 μm mesh sieve, thereby synthesizing a mixed-phase active material particle according to Example 5.

Example 6

A mixed-phase active material particle according to Example 6 was synthesized in the same method as described in Example 5, except that the time of main firing was 2 hours.

Example 7

A mixed-phase active material particle according to Example 7 was synthesized in the same method as described in Example 5, except that the time of main firing was 10 hours.

Example 8

A mixed-phase active material particle according to Example 8 was synthesized in the same method as described in Example 5, except that a molar ratio of $Nb_2O_5$ particles to $TiO_2$ particles was changed to 1.1:1 and each of $SiO_2$, $Fe_2O_3$ and $Ta_2O_5$ was added in an amount of 0.1 atm % relative to an Nb element in raw materials.

Example 9

A mixed-phase active material particle according to Example 9 was synthesized in the same method as described in Example 5, except that a molar ratio of $Nb_2O_5$ particles to $TiO_2$ particles was changed to 1.5:1 and KCl was added in an amount of 0.5 atm %, and each of $Na_2CO_3$, $P_2O_5$, and $SnO_2$ was added in an amount of 0.05 atm % relative to an Nb element in raw materials.

Example 10

A mixed-phase active material particle according to Example 10 was synthesized in the same method as described in Example 5, except that $Nb_2O_5$ particles having an average particle size D50 of 1.0 μm and $TiO_2$ particles having an average particle size D50 of 1.0 μm were used as starting materials.

Example 11

A mixed-phase active material particle according to Example 11 was synthesized in the same method as described in Example 5, except that a molar ratio of $Nb_2O$ particles to $TiO_2$ particles was changed to 1:1.

Comparative Example 1

The primary particles of the single phase of $Nb_2TiO_7$ phase synthesized in Example 1 was mixed with the primary particles of the single phase of the $Nb_{14}TiO_{37}$ phase synthesized in Example 2 at a weight ratio of 10.0% by weight to obtain an active material according to Comparative Example 1.

Comparative Example 2

An active material according to Comparative Example 2 was obtained in the same method as described in Example 10, except that a molar ratio of $Nb_2O_5$ particles to $TiO_2$ particles was changed to 1:1.

Comparative Example 3

A powder formed of only the primary particles of the single phase of the $Nb_{10}Ti_2O_{29}$ phase obtained in Example 1 was used as an active material powder according to Comparative Example 3.

<Powder X-Ray Diffraction Measurement and Calculation of Peak Intensity Ratio $I_B/I_A$>

The powder X-ray diffraction measurement described in the first embodiment was performed on the active material powders obtained in Examples 1 to 11 and Comparative Examples 1 to 3 under conditions of a sampling interval of 0.01° and a scanning rate of 2°/min. A peak intensity ratio $I_B/I_A$ described in the following Formula (1) was calculated for the obtained diffraction peaks.

$$0 < I_B/I_A \leq 0.25 \tag{1}$$

In Formula (1), $I_A$ is a peak intensity of the maximum peak attributed to the $Nb_2TiO_7$ phase and appearing at 2θ of 26.0±0.10 in a wide angle X-ray diffraction pattern under CuKα rays as an X-ray source, and $I_B$ is a peak intensity of the maximum peak attributed to the Nb-rich phase and appearing at 2θ of 24.9±0.2° in the diffraction pattern.

As an example, FIG. 13 illustrates diffraction peaks obtained by powder X-ray diffraction of the active material according to Example 5. Further, FIG. 14 illustrates diffraction peaks obtained by powder X-ray diffraction of the active material according to Comparative Example 1. In the FIGS. 13 and 14, the vertical axis shows the diffraction intensity in arbitrary units, and the horizontal axis shows the diffraction angle.

In the diffraction peaks illustrated in FIG. 13, a peak, attributable to the $Nb_2TiO_7$ phase with the maximum peak appearing within a range where 2θ is 26.0±0.10, was observed. In addition, a peak, attributable to the $Nb_{10}Ti_2O_{29}$ phase with the maximum peak appearing within a range where 2θ is 24.9±0.2°, was observed in the diffraction peaks illustrated in FIG. 13. When the peak intensity ratio $I_B/I_A$ was calculated for the two observed peaks, the peak intensity ratio $I_B/I_A$ of the active material according to Example 5 was 0.09.

In the diffraction peaks illustrated in FIG. 14, a peak, attributable to the $Nb_2TiO_7$ phase with the maximum peak appearing within a range where 2θ is 26.0±0.10, was observed. In addition, a peak, attributable to the $Nb_{14}TiO_{37}$ phase with the maximum peak appearing within a range where 2θ is 24.9±0.2°, was observed in the diffraction peaks illustrated in FIG. 14. When the peak intensity ratio $I_B/I_A$ was calculated for the two observed peaks, the peak intensity ratio $I_B/I_A$ of the active material according to Comparative Example 1 was 0.38.

<TEM Observation>

The active material powders obtained in Examples 1 to 11 and Comparative Examples 1 to 3 were observed by TEM to confirm the distribution of each crystal of the material having the single phase or mixed phase.

<Electrochemical Measurement>

First, 100% by mass of the niobium titanium composite oxide powder obtained in each example, 10% by mass of acetylene black as a conductive agent, 5% by mass of carbon nanofiber, 10% by mass of polyvinylidene fluoride (PVdF) as a binder were added with N-methylpyrrolidone (NMP) and mixed to obtain a slurry. This slurry was applied to one side of a current collector made of an aluminum foil having a thickness of 12 μm, and then, was subjected to drying and pressing, thereby producing an electrode having an electrode density of 2.4 g/cm³.

Next, an electrolytic solution was prepared by dissolving $LiPF_6$ as a supporting salt, at a concentration of 1 mol/L, in a mixed solvent in which ethylene carbonate (EC) and diethyl carbonate (DEC) were mixed at a volume ratio of 1:2.

The obtained electrode was used as a working electrode and Li metal was used as a counter electrode and also Li metal was used as a reference electrode to produce a three-electrode-type beaker cell using the obtained electrolytic solution, and electrochemical characteristics thereof ware evaluated.

In the present examples, since the lithium metal is used as the counter electrode in the three-electrode-type beaker cell for measurement, electrode potentials of the examples and the comparative examples are nobler than that of the counter electrode, and thus, operate as a positive electrode. Thus, the definitions of charging and discharging become opposite when the electrodes of the examples and the comparative examples are used as a negative electrode. Here, in the present examples, directions in which lithium ions are inserted into the electrode are collectively referred to as charging, and directions of extracting lithium ions from the electrode are consistently referred to as discharging in order to avoid confusion. Incidentally, the active materials of the present embodiments operate as a negative electrode by combining with a known positive electrode material.

The produced electrochemical measurement cell was charged and discharged in a potential range from 1.0 V to 3.0 V using a lithium metal electrode as a reference. A charge/discharge current value was set to 0.2 C (hourly discharge rate), and 0.2 C discharge capacity was confirmed at room temperature. The value of 0.2 C discharge capacity is an index of energy density.

Next, a life test in which charging and discharging at 0.2 C were repeated in a potential range from 0.5 V to 3.0 V using the lithium metal electrode as the reference was performed at room temperature for cells of the examples and comparative examples in order to confirm that the negative electrode active material of the examples can be stably charged and discharged even under an over-charge condition. Under the condition, charging and discharging were repeated 100 cycles (the charging and discharging is defined as one cycle), and a discharge capacity retention ratio after 100 cycles was investigated. In order to confirm the discharge capacity retention ratio after 100 cycles, the charging and discharging were performed again at 0.2 C (hourly discharge rate), a cycle capacity retention ratio (%) in a case where an initial charge/discharge capacity is 100% was calculated by dividing the discharge capacity after 100 cycles by an initial discharge capacity and multiplying by 100.

The above results are summarized in Tables 1 and 2. In Tables 1 and 2, in the column of "Molar ratio of raw material $Nb_2O_5:TiO_2$", an example in which the ratio is described at two stages indicates that the $Nb_2TiO_7$ phase was synthesized in a molar ratio at the first line and the $Nb_{10}Ti_2O_{29}$ phase, the $Nb_{14}TiO_{37}$ phase, or the $Nb_{24}TiO_{64}$ phase was synthesized in a molar ratio at the second line. In the column of "Crystal Phase in Primary Particle", an active material according to an example described as "Single Phase" contains primary particles of the single phase of the $Nb_2TiO_7$ phase, primary particles of the single phase of the $Nb_{10}Ti_2O_{29}$ phase, primary particles of the single phase of the $Nb_{14}TiO_{37}$ phase, and/or primary particles of the single phase of the $Nb_{24}TiO_{64}$ phase. An active material according to an example described as "Mixed Phase" contained mixed-phase active material particles including a shell part formed of the $Nb_2TiO_7$ phase and a core part formed of the Nb-rich phase. The mixed-phase active material particles included an intermediate part interposed between the core part and the shell part, and the intermediate part had a concentration gradient of the $Nb_2TiO_7$ phase rising from the core part side to the shell part side. Further, it was confirmed by the TEM observation that the $Nb_2TiO_7$ phase and the Nb-rich phase interpenetrated each other at least in a part of the intermediate part of the active material according to the examples described as "Mixed Phase".

TABLE 1

| | Molar ratio of raw material $Nb_2O_5:TiO_2$ | Average particle size of raw material D50 (μm) | Main firing condition | Crystal phase | Peak intensity ratio $I_B/I_A$ | Crystal phase in primary particle | 0.2 C discharge capacity (mAh/g) | Cycle capacity retention ratio (%) |
|---|---|---|---|---|---|---|---|---|
| Example 1 | 1.0:1.0 2.5:1.0 | $Nb_2O_5$: 1.0 $TiO_2$: 1.0 | 1200° C., 5 h | $Nb_2TiO_7$ + $Nb_{10}Ti_2O_{29}$ | 0.15 | Single phase | 265.9 | 67.9 |
| Example 2 | 1.0:1.0 14.0:1.0 | $Nb_2O_5$: 1.0 $TiO_2$: 1.0 | 1200° C., 5 h | $Nb_2TiO_7$ + $Nb_{14}TiO_{37}$ | 0.18 | Single phase | 265.3 | 68.3 |
| Example 3 | 1.0:1.0 24:1.0 | $Nb_2O_5$: 1.0 $TiO_2$: 1.0 | 1200° C., 5 h | $Nb_2TiO_7$ + $Nb_{24}TiO_{62}$ | 0.17 | Single phase | 264.8 | 68.9 |
| Example 4 | 1.0:1.0 2.5:1.0 | $Nb_2O_5$: 1.0 $TiO_2$: 1.0 | 1200° C., 5 h | $Nb_2TiO_7$ + $Nb_{10}Ti_2O_{29}$ | 0.005 | Single phase | 265.3 | 63.7 |
| Example 5 | 1.05:1.0 | $Nb_2O_5$: 25.0 $TiO_2$: 1.0 | 1000° C., 5 h | $Nb_2TiO_7$ + $Nb_{10}Ti_2O_{29}$ | 0.09 | Mixed phase | 269.1 | 77.4 |
| Example 6 | 1.05:1.0 | $Nb_2O_5$: 25.0 $TiO_2$: 1.0 | 1000° C., 2 h | $Nb_2TiO_7$ + $Nb_{10}Ti_2O_{29}$ | 0.25 | Mixed phase | 262.3 | 80.1 |
| Example 7 | 1.05:1.0 | $Nb_2O_5$: 25.0 $TiO_2$: 1.0 | 1000° C., 10 h | $Nb_2TiO_7$ + $Nb_{10}Ti_2O_{29}$ | 0.01 | Mixed phase | 267.1 | 70.2 |
| Example 8 | 1.1:1.0 | $Nb_2O_5$: 25.0 $TiO_2$: 1.0 | 1000° C., 5 h | $Nb_2TiO_7$ + $Nb_{14}TiO_{37}$ | 0.07 | Mixed phase | 268.5 | 76.8 |
| Example 9 | 1.5:1.0 | $Nb_2O_5$: 25.0 $TiO_2$: 1.0 | 1000° C., 5 h | $Nb_2TiO_7$ + $Nb_{24}TiO_{62}$ | 0.08 | Mixed phase | 268.4 | 77.1 |
| Example 10 | 1.05:1.0 | $Nb_2O_5$: 1.0 $TiO_2$: 1.0 | 1000° C., 5 h | $Nb_2TiO_7$ + $Nb_{10}Ti_2O_{29}$ | 0.004 | Mixed phase | 264.5 | 65.4 |
| Example 11 | 1.0:1.0 | $Nb_2O_5$: 25.0 $TiO_2$: 1.0 | 1000° C., 5 h | $Nb_2TiO_7$ + $Nb_{10}Ti_2O_{29}$ + $TiO_2$ | 0.05 | Mixed phase | 264.7 | 65.9 |

TABLE 2

| | Molar ratio of raw material $Nb_2O_5:TiO_2$ | Average particle size of raw material D50 (μm) | Main firing condition | Crystal phase | Peak intensity ratio $I_B/I_A$ | Crystal phase in primary particle | 0.2 C discharge capacity (mAh/g) | Cycle capacity retention ratio (%) |
|---|---|---|---|---|---|---|---|---|
| Comparative Example 1 | 1.0:1.0 14.0:1.0 | $Nb_2O_5$: 1.0 $TiO_2$: 1.0 | 1200° C., 5 h | $Nb_2TiO_7$ + $Nb_{14}TiO_{37}$ | 0.38 | Single phase | 248.9 | 65.6 |
| Comparative Example 2 | 1.0:1.0 | $Nb_2O_5$: 1.0 $TiO_2$: 1.0 | 1000° C., 5 h | $Nb_2TiO_7$ | 0 | Single phase | 270.4 | 58.5 |
| Comparative Example 3 | 2.5:1.0 | $Nb_2O_5$: 1.0 $TiO_2$: 1.0 | 1200° C., 5 h | $Nb_{10}Ti_2O_{29}$ | — | Single phase | 238.2 | 67.8 |

As illustrated in Examples 1 to 11, the active material containing the $Nb_2TiO_7$ phase and at least one Nb-rich phase selected from the group consisting of the $Nb_{10}Ti_2O_{29}$ phase, the $Nb_{14}TiO_3$, phase, and the $Nb_{24}TiO_{64}$ phase and satisfying the peak intensity ratio $I_B/I_A$ of $0<I_B/I_A \leq 0.25$ had a high 0.2 C discharge capacity and an excellent cycle capacity retention ratio.

On the other hand, the 0.2 C discharge capacity, that is, the energy density of Comparative Example 1 in which the peak intensity ratio was 0.38 was inferior to those of Examples 1 to 11. This is because Comparative Example 1 contains the excessive amount of the $Nb_{14}TiO_{37}$ phase as the Nb-rich phase. In addition, the cycle capacity retention ratio of Comparative Example 2 containing no Nb-rich phase was inferior to those of Examples 1 to 11. It is considered that a reason of this is that an over-charge resistance of the active material according to Comparative Example 2 is inferior. In addition, the 0.2 C discharge capacity of Comparative Example 3 containing no $Nb_2TiO_7$ phase was inferior to those of Examples 1 to 11.

While the peak intensity ratio is less than 0.01 in Examples 4 and 10, the peak intensity ratio is 0.01 to 0.25 in the other Examples 1 to 3, 5 to 9 and 11. Examples 1 to 3, 5 to 9 and 11 with the peak intensity ratio $I_B/I_A$ satisfying $0.01 \leq I_B/I_A \leq 0.25$ were excellent in the discharge capacity and the cycle capacity retention ratio.

An example including the mixed-phase active material particles illustrated in Examples 5 to 11 will be discussed. Examples 5 to 9 are examples in which the starting materials were mixed such that the molar ratio of the starting materials became richer in Nb than $Nb_2O_5:TiO_2=1:1$ and the average particle size of the $Nb_2O_5$ particles as the raw material was larger than the average particle size of the $TiO_2$ particles. In these examples, the discharge capacity and the cycle capacity retention ratio were excellent even under the conditions where the firing time was decreased or increased to make the diffusion time of Ti relatively short or relatively long as in Examples 6 and 7, for example.

Even when the starting materials were mixed such that the molar ratio thereof became Nb-richer than $Nb_2O_5:TiO_2=1:1$ as in Example 10, the diffusion of Ti into the $Nb_2O_5$ particles easily proceed if the average particle size of the $Nb_2O_5$ particles as the raw material is the same as the average particle size of the $TiO_2$ particles. As a result, a generation amount of the $Nb_{10}Ti_2O_{29}$ phase as the core part decreased, and the peak intensity ratio $I_B/I_A$ was as small as 0.004. The cycle capacity retention ratios of Examples 5 to 9 were superior to that of Example 10.

Even when the average particle size of the $Nb_2O_5$ particles as the raw material is larger than the average particle size of the $TiO_2$ particles as in Example 11, the $TiO_2$ particles which have not been diffused into the $Nb_2O_5$ particles remain if the molar ratio of the starting materials is $Nb_2O_5:TiO_2=1:1$. The cycle capacity retention ratios of Examples 5 to 9 were superior to that of Example 11.

<Charge and Discharge Test of Battery Pack>

Example 9

In Example 9, two nonaqueous electrolyte batteries (rated capacity: 1000 mAh) were produced in the following procedure using the active material powder according to Example 5. Thereafter, these two nonaqueous electrolyte batteries were connected to prepare a set of two-series battery pack.

(Manufacture of Negative Electrode)

100% by mass of the active material powder obtained in Example 5, 10% by mass of acetylene black as a conductive agent, 5% by mass of carbon nanofiber, 10% by mass of polyvinylidene fluoride (PVdF) as a binder were added with N-methylpyrrolidone (NMP) and mixed to obtain a slurry. This slurry was applied on both sides of a current collector made of an aluminum foil having a thickness of 12 μm, and was dried under vacuum at 130° C. for 12 hours to obtain a laminate. Thereafter, the laminate was pressed so as to have the density of an electrode layer (excluding the current collector) of 2.4 g/cm³, thereby obtaining a negative electrode.

(Manufacture of Positive Electrode)

A commercially-available lithium cobalt oxide ($LiCoO_2$) was mixed with acetylene black as a conductive aid at a ratio of 5 parts by mass to obtain a mixture. Next, this mixture was dispersed in NMP to obtain a dispersion solution. This dispersion solution was mixed with PVdF as a binder at a ratio of 5 parts by mass relative to the lithium cobalt oxide to prepare a positive electrode slurry. This slurry was applied on both sides of a current collector made of an aluminum foil of 12 μm using a blade. The current collector on which the slurry was applied was dried under vacuum at 130° C. for 12 hours to obtain a laminate. Thereafter, the laminate was pressed so as to have the density of an electrode layer (excluding the current collector) of 2.2 g/cm³, thereby obtaining a positive electrode.

(Production of Electrode Group)

The positive electrode and the negative electrode produced as described above were laminated with a polyethylene separator interposed therebetween to obtain a laminate. Next, the laminate was wound and then pressed to obtain a wound electrode group having a flat shape. A positive electrode terminal and a negative electrode terminal were connected to this electrode group.

(Preparation of Nonaqueous Electrolyte)

A mixed solvent of ethylene carbonate and diethyl carbonate (volume ratio 1:1) was prepared as a mixed solvent. Lithium hexafluorophosphate ($LiPF_6$) was dissolved in this solvent at a concentration of 1 M. Thus, a nonaqueous electrolyte was prepared.

(Assembly of Nonaqueous Electrolyte Battery)

A nonaqueous electrolyte battery was produced by placing the electrode group produced as described above in a battery casing of aluminum laminate, injecting the nonaqueous electrolyte, and then, sealing the battery casing with heat sealing. Furthermore, an additional nonaqueous electrolyte battery identical to the above nonaqueous electrolyte battery was produced.

Comparative Example 7

In Comparative Example 7, two nonaqueous electrolyte batteries (rated capacity: 1000 mAh) were produced in the same manner as in Example 9, except that the active material powder according to Comparative Example 2 was used as a negative electrode active material. Thereafter, these two nonaqueous electrolyte batteries were connected to prepare a set of two-series battery pack.

(Charge/Discharge Test)

The battery packs according to Example 9 and Comparative Example 7 were subjected to a life test at room temperature. In a charge/discharge test, charging and discharging were repeated 100 cycles (the charging and discharging is defined as one cycle) with a cell voltage in a potential range of 3.0 V to 5.6 V at a charge/discharge current value of 0.2 C (hourly discharge rate) to investigate a discharge capacity retention ratio after 100 cycles. The cycle capacity retention ratio (%) in a case where an initial charge/discharge capacity is 100% was calculated by dividing the discharge capacity after 100 cycles by an initial discharge capacity and multiplying by 100.

The result showed that the capacity retention ratio after 100 cycles was 98.3% in the battery pack of Example 9, but was 83.2% in Comparative Example 7. Batteries were taken out from the battery packs according to Example 9 and Comparative Example 7, were decomposed in a dry argon atmosphere, and voltages of a positive electrode and a negative electrode were measured. As a result, it was found that the battery included in the battery pack of Example 9 had small potential changes of the positive electrode and the negative electrode as compared to the battery of Comparative Example 7, and design voltage of Example 9 was maintained. That is, an over-charge resistance and cycle life characteristics of the battery included in the battery pack of Example 9 were superior to those of the battery of Comparative Example 7.

When the battery can be stably operated in one set of two series as in Example 9, it is possible to greatly simplify a mechanism for monitoring a cell voltage in the battery pack. As a result, it is possible to improve a volume energy density and a weight energy density of the battery pack.

According to at least one of the embodiments and examples described above, an active material is provided. The active material includes an $Nb_2TiO_7$ phase and at least one Nb-rich phase selected from the group consisting of an $Nb_{10}Ti_2O_{29}$ phase, an $Nb_{14}TiO_{37}$ phase, and an $Nb_{24}TiO_{64}$ phase, and satisfies a peak intensity ratio represented by the following Formula (1).

$$0 \leq I_B/I_A \leq 0.25 \tag{1}$$

In Formula (1), $I_A$ is a peak intensity of the maximum peak attributed to the $Nb_2TiO_7$ phase and appearing at 2θ of 26.0±0.1° in a wide angle X-ray diffraction pattern under CuKα rays as an X-ray source. $I_B$ is a peak intensity of the maximum peak attributed to the at least one Nb-rich phase and appearing at 2θ of 24.9±0.2° in the diffraction pattern. This active material can realize the secondary battery which can exhibit the excellent weight energy density, over-charge resistance, and cycle life characteristics.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An active material comprising:
an $Nb_2TiO_7$ phase; and
at least one Nb-rich phase selected from a would consisting of an $Nb_{10}Ti_2O_{29}$ phase, an $Nb_{14}TiO_{37}$ phase, and an $Nb_{24}TiO_{64}$ phase,
wherein the active material comprises mixed-phase active material particles comprising: a shell part formed of the $Nb_2TiO_7$ phase; and a core part surrounded by the shell part and formed of the at least one Nb-rich phase,
the mixed-phase active material particles further comprises an intermediate part interposed between the core part and the shell part,
the intermediate part comprises the $Nb_2TiO_7$ phase and the at least one Nb-rich phase and has a concentration gradient of the $Nb_2TiO_7$ phase rising from a side of the core part to a side of the shell part, and
the active material satisfies a peak intensity ratio represented by Formula (I):

$$0 < I_B/I_A \leq 0.25 \tag{1}$$

wherein in the Formula (1), $I_A$ is a peak intensity of a maximum peak attributed to the $Nb_2TiO_7$ phase and appearing at 2θ of 26.0±0.1° in a wide angle X-ray diffraction pattern under a CuKα ray as an X-ray source, and $I_B$ is a peak intensity of a maximum peak attributed to the at least one Nb-rich phase and appearing at 2θ of 24.9±0.2° in the diffraction pattern.

2. The active material according to claim 1, satisfying Formula (2):

$$0.01 \leq I_B/I_A \leq 0.25 \tag{2}$$

3. The active material according to claim 1, wherein the $Nb_2TiO_7$ phase and the at least one Nb-rich phase interpenetrate each other in at least a part of the intermediate part.

4. An electrode comprising the active material according to claim 1.

5. The electrode according to claim 4, wherein the electrode comprises an active material-containing layer comprising the active material.

6. A secondary battery comprising:
a positive electrode;
a negative electrode; and
an electrolyte,
wherein the negative electrode is the electrode according to claim 4.

7. A battery pack comprising the secondary battery according to claim 6.

8. The battery pack according to claim 7, further comprising:
an external power distribution terminal; and
a protective circuit.

9. The battery pack according to claim 7, comprising plural of the secondary battery, wherein the secondary batteries are electrically connected in series, in, parallel, or in a combination of in series and in parallel.

10. A vehicle comprising the battery pack according to claim 7.

11. The vehicle according to claim 10, which comprises a mechanism configured to convert kinetic energy of the vehicle into regenerative energy.

* * * * *